(12) United States Patent
Nafeh

(10) Patent No.: US 7,693,778 B2
(45) Date of Patent: Apr. 6, 2010

(54) RISK MANAGEMENT CONTRACTS AND METHOD AND APPARATUS FOR TRADING SAME

(76) Inventor: John Nafeh, 7 Thistle, Portola Valley, CA (US) 94028

( * ) Notice: Subject to any disclaimer, the term of this patent is extended or adjusted under 35 U.S.C. 154(b) by 0 days.

(21) Appl. No.: 11/596,533

(22) PCT Filed: May 13, 2005

(86) PCT No.: PCT/US2005/016810

§ 371 (c)(1),
(2), (4) Date: Nov. 13, 2006

(87) PCT Pub. No.: WO2005/114517

PCT Pub. Date: Dec. 1, 2005

(65) Prior Publication Data

US 2007/0233594 A1     Oct. 4, 2007

Related U.S. Application Data

(60) Provisional application No. 60/570,970, filed on May 14, 2004.

(51) Int. Cl.
*G06Q 40/00* (2006.01)
(52) U.S. Cl. .......................... 705/37; 705/35; 705/36 R
(58) Field of Classification Search ................... 705/37, 705/36 R, 35, 38, 26, 4
See application file for complete search history.

(56) References Cited

U.S. PATENT DOCUMENTS

| | | | |
|---|---|---|---|
| 4,232,367 A | 11/1980 | Youden et al. | |
| 4,633,397 A | 12/1986 | Macco | |
| 4,742,457 A | 5/1988 | Leon et al. | |
| 4,752,877 A | 6/1988 | Roberts et al. | |
| 4,766,539 A | 8/1988 | Fox | |
| 4,839,804 A | 6/1989 | Roberts et al. | |
| 4,876,648 A | 10/1989 | Lloyd | |
| 5,083,270 A | 1/1992 | Gross et al. | |
| 5,101,353 A | 3/1992 | Lupien et al. | |
| 5,136,501 A | 8/1992 | Silverman et al. | |
| 5,206,803 A | 4/1993 | Vitagliano et al. | |

(Continued)

OTHER PUBLICATIONS

Ronald Chung and Hung-Gay Fung. "Steering Clear of Derivatives Risk." TMA Journal, 15(5), 10. Sep. 1995, p. 2.*

(Continued)

*Primary Examiner*—Kelly Campen
(74) *Attorney, Agent, or Firm*—Carr & Ferrell LLP

(57) ABSTRACT

Provided herein are various exemplary methods and apparatus for implementation of futures securities custom tailored to specific clienteles; one or more variable pay-out futures contracts as devices for hedging; hedging contracts having variable pay-outs; variable payout hedging contracts having limited exposure; freezing assets of an originator of an order to buy or sell a variable pay-out contract sufficient to cover a maximum exposure of the contract; determining whether an originator of an order to buy or sell a variable pay-out contract has assets sufficient to cover the contract at the time of placing the order; determining whether an originator of an order to buy or sell a variable pay-out contract has assets sufficient to cover the contract immediately before fulfilling the order and charging a penalty to an originator of an order to buy or sell a variable pay-out contract who does not have assets sufficient to cover the contract.

8 Claims, 6 Drawing Sheets

U.S. PATENT DOCUMENTS

| | | | |
|---|---|---|---|
| 6,067,532 A | 5/2000 | Gebb | |
| 6,236,900 B1 | 5/2001 | Geiger | |
| 6,260,024 B1 | 7/2001 | Shkedy | |
| 6,321,212 B1* | 11/2001 | Lange | 705/36 R |
| 6,496,809 B1 | 12/2002 | Nakfoor | |
| 6,564,192 B1 | 5/2003 | Kinney, Jr. et al. | |
| 7,206,755 B1 | 4/2007 | Muralidhar | |
| 2002/0069155 A1 | 6/2002 | Nafeh et al. | |
| 2002/0099640 A1* | 7/2002 | Lange | 705/37 |
| 2002/0120555 A1* | 8/2002 | Lerner | 705/37 |
| 2003/0208406 A1 | 11/2003 | Okamoto et al. | |
| 2004/0153375 A1* | 8/2004 | Mukunya et al. | 705/26 |

OTHER PUBLICATIONS

Krueger, Diane. "Opting for Options." Futures 101. Jul. 2000, pp. 70-77.*

Anonymous, Global Sports Exchange Specification, Apr. 30, 1999.

"The Secret Money Machine." Time. New York: Apr. 11, 1994. vol. 143, Issue 15, p. 28 (7pp) (six pages provided herewith).

"Futures Contracts." RMA Online. http://web.archive.org/web/20010124001500/http://www.rma.usda.gov/pubs/rme/fsh_7.htm. (Last updated date: Monday, Oct. 4, 1999), 3 pages.

\* cited by examiner

RISK MANAGEMENT CONTRACTS AND METHOD AND APPARATUS FOR TRADING SAME

CROSS-REFERENCE TO RELATED APPLICATIONS

This application relates to technology which is similar to that disclosed in published co-pending application Ser. No. 09/923,035, filed Aug. 6, 2001 and U.S. Provisional application Ser. No. 60/570,970, filed May 14, 2004, the entire content of which are hereby incorporated by reference.

FIELD OF THE INVENTION

The present invention relates to a method and apparatus for risk management and to a method and apparatus for establishing and maintaining a market for initial and secondary trading in risk management instruments. The scope of the invention includes, but is not limited to: methods of defining risk management instruments, methods of trading specific types of risk management instruments to manage risk, methods of managing risk, and methods of making a market so that persons may manage risk by trading in such market.

BACKGROUND OF THE INVENTION

General George Patton is reputed to have once said, "Take calculated risks. That is quite different from being rash." General Patton's attitudes about risk had far-reaching implications indeed, in that the decisions he made and the risks he took sometimes cost the lives of men in battle. But the notion of calculated risk goes well beyond warfare; it is a process that we all engage in as we make the daily decisions that define our lives. And the fact remains that most of the risks—economic and otherwise—that individuals face in their lives are not shared by society. As inefficient and insecure as it may seem, "we allow our standards of living to be determined substantially by a game of chance."

Over the years a number of instruments have emerged that enable people to "hedge their bets" in the face of risk. Insurance, in its many forms, is the classic example of a hedge instrument. So too, is the futures market for hedging the price of commodities. In fact, a futures market can exist for anything, functioning as a market where bets can be placed on the course of the price or index that defines that market. Hedging in any market—whether it be commodities, real estate, or anything with any kind of economic consequences—is essentially the same as buying insurance against price changes.

A number of financial management systems have been proposed in the past. Exemplary systems include U.S. Pat. Nos. 4,232,367, 4,633,397, 4,742,457, 4,752,877, 4,766,539, 4,839,804, 4,876,648, 5,083,270, 5,101,353, 5,136,501 and 5,206,803. Broadly speaking, the prior art has proposed several methods to transfer the types of risks, which are common to many people. These include banks, insurers, equities and commodities exchanges, the bond and swap markets, and mutual funds, each of which developed from a recognition that numerous parties with similar risk exposures needed effective methods of transfer and a means of determining the value of risk transfer at any given time.

These structures operate on the basis of transferring risk to an entity which utilizes one of two primary forms of capital structure: a capital leveraging system (banks and insurance companies) or a capital matching system (the exchanges and markets).

Under the capital leveraging system, an insurer may accept any type or amount of risk, subject to internal underwriting guidelines and regulatory restrictions. This format provides a significant degree of flexibility in the pricing, terms, and limits of risks accepted. These insurers operate on the premise that premiums cover claims. Their capital is available to pay claims if losses exceed premiums and investment income. The aggregate of policy liabilities though, is generally much larger than their combined premium and capital. So, like a bank, which could not pay if all depositors asked for their money, insurance companies are not generally designed to pay if all policies claimed their limits.

Leveraging capital, i.e., a small amount of capital compared to the risk exposures assumed, translates a small underwriting profit on premium into a substantial return on capital. Conversely, a relatively small loss over premium results in a significant loss to capital. This system does not absolutely assure an insurer's ability to pay in that an insurer's policy limits are generally much larger than its assets. Hence, an insurer must only accept risks common to many people, limiting its exposure to each single risk to a small percentage of its capital, and relying on geographic and risk type diversification, as well as reinsurance, to protect its shareholder's capital. This works well when losses are predictable. It is when insurers accept unique or difficult-to-place risks that premium as well as capital may not be sufficient to cover claims. Even Lloyd's of London (which operates in a manner similar to a collection of small insurance companies with the exception that should losses exceed available funds, its underwriting members, similar to shareholders, can be forced, in theory, to pay up to the limit of their assets) has experienced such difficulties.

Under the prior art, insurance policies have provided security to insureds based on and no greater than the general claims paying ability rating (the ability to pay claims) of an insurer to perform its obligations. Although reinsurance has sometimes been available, reinsurance policies likewise protect the insurer only to the extent of the reinsurance company's capacity to pay loss claims as they accrue.

In contrast, a capital matching system such as an exchange, accepts risk by matching buyers and sellers, i.e., parties transfer risk to those accepting it, in effect matching risk to capital. Under this system parties transfer or accept risks which are easily quantified in comparatively small units, such as through futures and options contracts. It limits the types and conditions under which parties may transfer to specifically defined contractual units, priced by the marketplace, being a price agreed between those parties wishing to transfer risk and those willing to accept it.

These narrowly defined contracts offer little flexibility in the risk being accepted. Although each investor can select the type and amount of risk accepted, parties transferring risks are not concerned with the performance of a specific party having accepted a corresponding amount of risk. The exchange stands as the intermediary between all parties, perfectly matched, with its only exposure being the credit performance of any one participant. Like Lloyd's, these parties' assets can be attached to secure their performance.

Each system operates on the basis of accepting risks which are common to large numbers of people. As financial transactions and our world in general grow more complex, certain types of risk exposures have become increasingly difficult to transfer in today's markets. In the insurance markets, catastrophic events and judicial reinterpretation have caused a contraction in some types of insurance capacity. It appears that today's insurance markets are frequently unable or unwilling to facilitate the transfer of unique risks such as those with a high possibility of loss, where the loss could come earlier rather than later or with more severity than projected. The exchanges have taken some steps toward addressing unique risks, such as catastrophe futures contracts, but again the terms are restrictive and do not easily integrate with the flexibility of a reinsurance contract. In essence, neither the exchanges nor mutual funds can accept a single unique risk.

In spite of insurance companies and exchanges, the fact remains that there are no existing instruments that people can use to hedge most of the common, everyday risks they face. For example, workers have no direct way to hedge against the pain of prolonged work stoppage. Retailers have no way to hedge against macroeconomic surprises in the global economy which could impact the availability of inventory items. And individuals have no way to hedge against government decisions—such as war, economic embargoes, legislation and a myriad of other possibilities—that could substantially impact their livelihoods.

One limited attempt to address the above shortcomings has been presented by the Iowa Electronic Markets (IEM), which are operated by faculty at the University of Iowa Tippie College of Business as part of a research and teaching mission. The IEM are real-money futures markets in which contract payoffs depend on economic and political events such as elections. More specifically, the IEM is a real-money, small-scale futures exchange in which the ultimate values of the contracts traded are determined by political events, financial events and economic indicators or other real-world events such as companies' earnings per share (EPS) or stock price returns. Participants in these markets invest their own funds, buy and sell listed contracts, and bear the risk of losing money as well as earning profits.

The exclusive purposes of the IEM are teaching and research. Through the IEM as a teaching device, participants learn first-hand about the operation of a financial market. Because they have an added incentive to do so, they often become better informed about events determining the ultimate value of the contract being traded—be that a political race, the earnings per share of a company, the stock return of a company, or the exchange rate between a foreign currency and the dollar. Through the IEM as a research venture, the markets provide insights into market and trader behavior. Participation in the IEM is open to students, faculty, and staff at colleges and universities worldwide; IEM political markets are also open to non-academic participants.

The IEM is operated as a not-for-profit venture. No commissions or transactions fees are charged, and the method of issuing contracts and making final payoffs on these contracts ensures that the IEM does not realize financial profits or suffer losses from market transactions. Although the IEM is under the regulatory purview of the Commodity Futures Trading Commission (CFTC), it is not regulated by, nor are its operator registered with, the CFTC or any other regulatory authority.

As noted above, the market operates on computer systems at the Henry B. Tippie College of Business of the University of Iowa; traders gain access through the World Wide Web. At the time of this writing, the home page for the IEM is maintained by the University of Iowa.

While the IEM goes somewhat beyond traditional commodity futures in the types of contracts which are offered, much of the system is modeled on conventional futures trading principles. Accordingly, IEM, like other traditional risk hedging methods such as insurance, offers a limited variety of contracts and provides incomplete markets and thus restricts opportunities for risk management.

Thus, presently available risk hedging methods, including IEM, fail to address potential needs of parties including such problem as:

Inadequate contract diversity to address the vast range of uncertainties for which risk hedging is potentially advantageous;

Excessive transaction costs rendering small markets of limited traders impractical;

Liquidity restrictions to trading viability in brick and mortar futures markets;

Inadequate real time communications capabilities necessary for market trading when traders are geographically dispersed;

Problems due to the absence of liquid secondary markets in tickets, coupons, hotel and airline reservations, and advance purchase orders; and Problems in inventory management Thus, there continues to be a long felt need for a system and a platform which brings buyers and sellers together, and thus engenders a viable and populated market across which a nearly unlimited variety of hedge instruments can be created and executed. But, because of a variety of heretofore insurmountable barriers, no such platform has yet emerged in the world.

SUMMARY OF THE INVENTION

In spite of existing brick and mortar futures markets, there exists a continuing need for additional futures markets to facilitate the vast variety of risk management needs. As described in the Prior Art section, liquidity is the lifeblood of existing futures markets. Traditional futures markets such as the CME require a minimum trading volume before they are able to sanction and administer the trading of a security. Without a rather high minimum trading volume, the market cannot break even.

Accordingly, in view of the shortcomings of prior art, it is an object of the present invention to provide a risk hedging, contract trading system whereby prospective traders can transact with each other with low transaction overhead, in real-time, near instantaneous speed, twenty-four hours-per-day, 7 days-per-week, and without any intermediary or broker.

It is also an object of the present invention to enable and provide markets, for trading to any interested parties, risk hedging contracts pertaining to a virtually unlimited range of possible events.

It is also an object of the present invention to enable and provide a system for creating and managing markets for risk hedging contracts having de minimus transaction costs so that a minimum market size or trading volume is not necessary for efficiency, practicality or viability.

It is a further object of the present invention to act as an umbrella aggregator, facilitator, administrator and electronic platform for supporting a nearly unlimited number of simultaneous trading markets in hedge instruments, and to act as a disseminator of information pertaining to the activities on these markets.

It is still a further object of the present invention to enable and provide a trading platform that is equally and nearly instantaneously accessible to traders who may be located anywhere in the world.

It is still a further object of the present invention to aggregate in one electronic platform support for simultaneous, but separate, trading of publicly-traded hedging instruments and trading of restricted hedging instruments, the trading of which is restricted to a group of specially authorized traders.

It is a still further object of the present invention to provide a trading platform together with all necessary support and brokerage services, including user-friendly Web interface, newswire, settlement, clearance, money transfer, and accounting management features.

It is a still further object of the present invention to act as a government sanctioned institution to interact with government regulatory agencies so that all activities within the platform comply with government regulations and principles of fairness, integrity, and public transparency.

It is a still further object of the present invention to be easily expandable and adaptive to incorporate the trading of new hedging instruments and, also, interact with new telecommunications media.

These and other objectives and advantages of the present invention are provided by a computer-network based futures trading system, or platform, which is electronically accessible by prospective traders, for enabling transactions related to futures contracts and futures contract bundles.

The computer-network based platform is preferably implemented as an internet-accessible web site, having an interactive interface and being configured to enable anyone who accesses the platform to apply for a new account and to view data and news related to activity within markets within the platform. The interface is configured to enable registered users to log in, place trades, and perform related maintenance activities related to their account.

The computer-network based system enables transactions relating to bundles of futures contracts, where each bundle includes at least two futures contracts, each of which corresponds to one of at least two future possible outcomes of a phenomenon at a time of maturity of the contracts. The futures contract bundles are defined to pay an aggregate fixed sum at maturity and each of constituent futures contracts pay the fixed sum at maturity upon the happening of the future possible outcome of the phenomenon associated with that particular risk management contract. Conversely, each of the risk management contracts pay a zero sum at maturity upon the non-happening of the future possible outcome of the phenomenon associated with that specific risk management contract.

Transactions on contract bundles include purchase and sale of complete bundles from the market authority, which always stands ready to sell or purchase bundles at a fixed, prestated price.

The computer-network based system also enables transactions relating to individual futures contracts, each of which are traded in an individual market. Owners of contracts may place limit orders to sell one or more contracts. Likewise, potential buyers of contract(s) may place limit orders offering to purchase one or more contracts at a certain price.

The computer-network based system also enables transactions relating to sets of individual futures contracts which do not form a complete bundle. In particular, at any given time the market authority has discretion either to split one contract into several separately traded contracts, or to recombine several contracts into one contract. The computer-network based system will facilitate splitting and recombination in an efficient way that is substantially automated and that does not reduce the event-based liquidation value of any contract owner.

The computer-network based system also has a means for soliciting, evaluating, and optionally implementing ideas for innovative new contracts and contract bundles the trading of which enables hedging in new dimensions.

The computer-network based system also acts an umbrella aggregator, facilitator, and administrator of potentially thousands or millions of small, simultaneous markets, each of which may have virtually zero trading volume individually. This is possible because the platform profits from aggregate activity integrated over all of the small individual markets. Thus, the platform is able to (i) effectively "complete" the securities market for risk management; (ii) act as an umbrella portal where hedgers can go to access millions of futures markets in one place; and (iii) provide a direct channel to the hedging and speculating clientele for advertisers and others.

The objectives and advantages of the present invention are also provided by a method for managing risk which, although preferably implemented in a computer-network based system, may also be implemented in a non-computerized method or process. Furthermore, certain aspects of the invention are achieved by the sale and trading among persons of what may be termed "contracts." Accordingly, certain methods or processes within the scope of the present invention may be conveniently defined, in part, by the definition of certain types of contracts to be traded.

Thus, in the following examples where specific types of "contracts" are described, it should be understood that certain embodiments of the present invention may relate to the specific or general methods for forming such contracts, methods for making an initial public offerings for such contracts, methods for creating a secondary market for trading in such contracts and methods relating to the redemption or settlement of such contracts, or combinations of the foregoing. Each such method, while potentially having high level similarities between and among different contract types, may also have unique and specific method steps which are related to or derive from the specific contract types and the details of the contract type.

Accordingly, for the purposes of this disclosure, one of skill in the relevant field of art will understand that each description of a "type of contract" may be regarded, in part, as a shorthand for a novel and different method of forming such contracts, methods for making an initial public offerings for such contracts, methods for creating a secondary market for trading in such contracts and methods relating to the redemption or settlement of such contracts, or combinations of the foregoing, where the specific method steps derive from the attributes of each specific type of contract. In other words, one of skill in the relevant field of art will understand that each description of a "type of contract" is not merely a description of the terms and conditions of a legal agreement.

One aspect of the present invention is that, because of new software and database technologies and the instantaneous multimedia, multi-user telecommunications capability offered by the World Wide Web, it is now profitable to facilitate and administer the trading of futures contracts with very low or even negligible trading volume. This is because given "template" software and Web interfaces for futures markets, it is virtually costless to electronically reproduce this template again and again to facilitate the trading of highly specialized hedging instruments—even instruments with extremely low popularity and trading interest. If at least two counterparties (one buyer and one seller) are interested in trading a futures contract, everyone is better off if a market is created to enable the two parties to establish their positions: the two counterparties benefit from establishing their positions, and any third party speculators and spectators benefit from either participating or just passively observing the transaction price. (I.e., the transaction price reveals information about the traders' expectations.)

BRIEF DESCRIPTION OF THE DRAWINGS

A more complete understanding of the present invention and its advantages will be readily apparent from the following Detailed Description taken in conjunction with the accompanying drawings. Throughout the accompanying drawings, like parts are designated by like reference numbers.

DETAILED DESCRIPTION OF THE INVENTION

I. Types of Contracts

Figure 1:
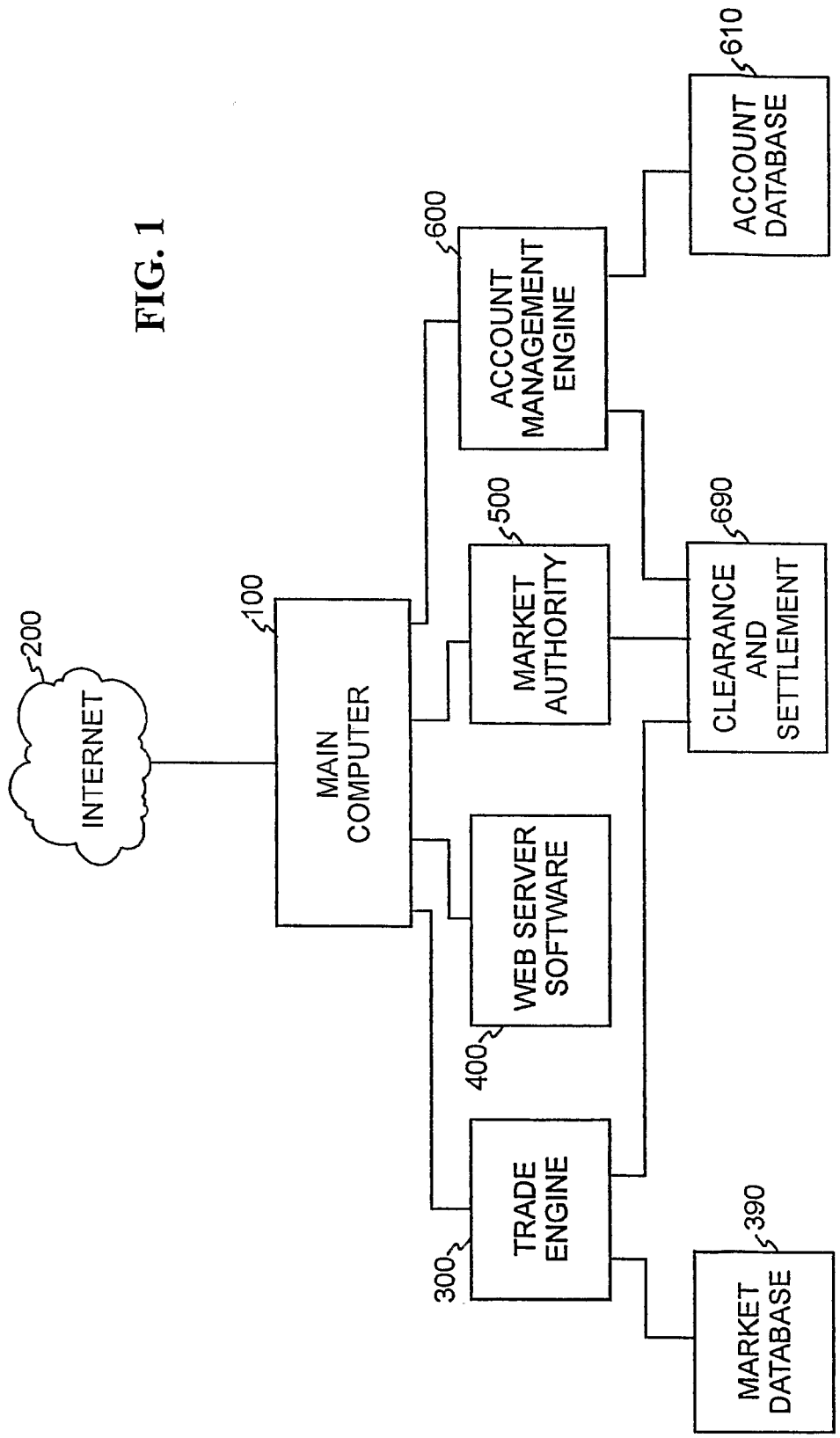
FIG. 1 illustrates a preferred embodiment of the present invention implemented as a general internet-based web-server.

As noted in the summary of the invention, an objective of the present invention is to enable and provide a new form of risk hedging. While the present invention is directed to a novel method and apparatus for risk hedging, proper understanding of the invention first requires an understanding of various hedging contracts or instruments, the sale and transactions in which are a necessary adjunct to the inventive process and apparatus. Accordingly, next will be discussed several types of contracts or hedging instruments which can be used in the inventive system. For convenience, these types of contracts are referred to herein as Type I contracts, Type II contracts and Type III contracts, and/or Fixed Pay-out hedging instruments, Variable pay-out hedging instruments, and Hedglet bundles. Based on the present disclosure, however, one of ordinary skill in the art will appreciate that the present invention is not limited to these types of contracts and many other types of contracts could be employed to hedge risk without departing from the spirit of the present invention.

A. Type I ("Event") Contracts

As the name suggests, event contracts pay out based on the realized outcome of contingent events. By way of example and not by way of limitation, an event contract may pay off either $10 or $0 depending on the outcome of a specified event. If a particular criteria is met (i.e. a particular outcome occurs), then the claim pays off $10. Otherwise, the contract pays off $0. Event contracts are cash settled. Event contracts can be designed around almost any risky event in the world. For instance, events may be a state's gubernatorial election; firm's quarterly earnings announcement; or Federal Reserve Open Market Committee (FOMC) meeting announcements. Examples of outcomes corresponding to these events might be, respectively, whether the incumbent governor wins re-election; whether the firm meets or beats analysts' expectations; or whether the Fed hikes interest rates. There are an unlimited number of possible events which can be commodified with event contracts and therefore render, for the very first time, their associated risks hedgeable.

Type I contracts will be designed specifically to hedge economic risks contingent on future events. Contracts are designed in such a way that they can be used, with reasonable predictability, by participants in the contract market to neutralize, or at least reduce, the risk of an adverse outcome with respect to the underlying event. Like futures contracts traded in existing contract markets, they are intended as risk-shifting vehicles.

A full understanding of the types of contracts and the present invention requires an appreciation of the following terminology which is used throughout this application:

The "market authority" is the official agent charged with the absolute authority and ability—subject to legal limitations—to issue, expire, terminate, buy, sell, or otherwise alter the nature of the instruments trading in the market, and to alter the nature of the market itself.

A state of nature "s" is a possible final outcome realized at a prespecified date T. States of nature, s and s', are mutually exclusive if they cannot occur together. A set of states, S={s1, s2, . . . , sN} is complete if: (i) the members of S are all mutually exclusive, and (ii) every possible final outcome is a member of S. The number, N, of states of S can be, in principle, any number greater than or equal to 2.

A contract is a tradable instrument that pays off a nonzero value in one state of nature, s, and $0 in all other states of nature at date T. In the following examples and throughout this specification, for simplicity, the nonzero payoff value of the tradeable instrument in the one state of nature will be $10, however, one of ordinary skill in the relevant art will appreciate that any value can be used.

In the following examples, date T will sometimes be referred to as the "expiry" date, and will typically include a time.

A "contract bundle" is a collection of contracts whose aggregate payoff at date T in any state of nature is $10. For instance, suppose S={s1, s2, s3, s4, s5} is a complete set of possible states for a given event. Then a bundle might consist of the set {A, B, C, D, E} of 5 contracts. In this example:

At time T, contract #1 (A) pays off $10 if state s1 occurs, and $0 otherwise.

At time T, contract #2 (B) pays off $10 if state s2 occurs, and $0 otherwise.

At time T, contract #3 (C) pays off $10 if state s3 occurs, and $0 otherwise.

At time T, contract #4 (D) pays off $10 if state s4 occurs, and $0 otherwise.

At time T, contract #5 (E) pays off $10 if state s5 occurs, and $0 otherwise.

Because the possible states for a given event {s1, s2, s3, s4, s5} are mutually exclusive, and because the set S includes all possible outcomes, one (but only one) of the states will be achieved at time T. Thus, regardless of which one of the states is achieved at time T, the aggregate value of the contract bundle will always be $10.

According to the present invention, there can be otherwise identical contracts and/or contract bundles whose only difference is the expiration date T. For example, quarterly earnings announcements occur four times a year. Thus, at any one time, there can be a first set of contracts which pay off depending on the outcome of Company A's first quarter announcement; a second set of contracts whose payoff depends on Company A's second quarter results; and a third and fourth set which pay off depending on Company A's third and fourth quarter results, respectively. The collection of all these contracts would be referred to as the "earnings announcement class for Company A." All contracts in this class with the same expiration date would be referred to as the date T contract series of that class. For instance, "the second quarter series contract of Company A" refers to the contracts whose payoff is determined by the outcome of Company A's earnings announcement in the second quarter. Note that Company A's earnings announcement class could consist of more or less than four contract series depending on how many expiration dates the market authority sanctions contracts for.

TYPE I CONTRACT EXAMPLES

To further explain and clarify the concept of a Type I, or event, contract several exemplary and illustrative examples are provided below.

Example 1

Gubernatorial Election

State A is scheduled to hold a gubernatorial election in November. In February of the same year, the market authority could issue bundles of contracts which pay off depending on the outcomes of the election, as certified by the State's Secretary of State.

For the gubernatorial race, the set S={incumbent wins, otherwise} constitute a complete set of states at T of the results of the gubernatorial race. Accordingly, the bundle would consist of the set {A, B} of N=2 contracts. The bundle would sell for $10 where:

Contract A pays off $10 if, and only if, the incumbent governor wins reelection.
Contract B pays off $10 if, and only if, anybody else is certified as the winner of the gubernatorial race, for any reason.

The expiry date T is the day the Secretary of State (or the appropriate election authority) certifies the winner of the gubernatorial race in that state. If the ultimate realization of this date is in controversy, the decision of the market authority is final.

Example 2

Binary Contract

The gubernatorial race example is special kind of Type I contract referred to herein as a binary contract or hedglet. A Binary Hedglet is one wherein there are two possible outcomes: either an event occurs or does not occur. For example, the set S={event occurs, event does not occur} constitute a complete set of states at T of the results of some event. Accordingly, the bundle would consist of the set {Yes, No} of N=2 contracts. The bundle would sell for $10 where:

the Yes contract pays off $10 if, and only if, the event occurs;
The No contract pays off $10 if, and only if, the event does not occur, for any reason.

Thus, exactly one contract of the contract-pair pays out $10 at expiry; the other pays $0.

As an example, consider a binary hedging bundle based on the $1^{st}$ Q earnings of Zoran, Inc. An earnings announcement hedge bundle for 1st Qtr earnings of Zoran, Inc. may be listed by a Market Authority that pays out $10 if reported earnings are equal to or greater than their projected value, e.g., $0.02 (rounded to the nearest penny) per share (and $0 if they are not). The contracts making up the hedglet bundle would specify other details such as, for example, whether payout is based on the earnings before special items.

The Yes hedging instrument pays out $10 if earnings are equal or greater than $0.02 per share (and $0 if they are not). As the perception of earnings changes over time, active trading prices for the Yes and No hedging instruments would fluctuate as hedgers and speculators buy and sell earnings hedging instruments over a Market Authority.

Example 3

AOL Earnings Announcements

The "big board" NASDAQ and NYSE traded companies announce quarterly earnings 4 times per year on a regular (usually pre-announced) schedule. Although an earnings announcement does not become official until the company files a Form 10-K or 10-Q with the SEC, a hedging contract can define the contracted event as desired. For example, the contracted event could be defined as the earnings before special items as listed in a Form 10-K, 10-Q, or other official filing. Alternatively, the contracted event may be the earnings is an official company press release, or as reported in the Wall Street Journal, or any other report or announcement as specified in the hedging instruments.

The states which define the possible outcomes in this situation pertain to whether AOL "beats," "meets," or "misses" a benchmark (or "expected") earnings number. Thus, based on the above, the set S={beats, meets, misses} constitute the complete set of possible states at T for AOL Earnings. Accordingly, the bundle would consist of the set {A, B, C} of N=3 contracts. The bundle would sell for $10, where the expected earnings number is $0.40 and:

Contract A pays off $10 if and only if AOL's 1st Qtr earnings (before special items) exceeds $0.41 (rounded to the nearest penny) per share.
Contract B pays off $10 if and only if AOL's 1st Qtr earnings (before special items) falls within the range $0.39-$0.41 (rounded to the nearest penny) per share.
Contract C pays off $10 if and only if AOL's 1st Qtr earnings (before special items) falls below $0.39 (rounded to the nearest penny) per share.

Contract B's payoff range "$0.39-$0.41" intends to proxy for a best estimate of AOL "meeting" earnings expectations. The Market Authority acting in accordance with the present invention determines/chooses this numerical range based on its own private judgment. To pick these payoff criteria, the Market Authority can consult First Call or other financial analyst forecast databases (including "whisper number" databases). No matter, the Market Authority preferably reserves the right to pick this number internally any way it chooses. Even more preferably, the Market Authority does not publicly commit to any predetermined formula for choosing the payoff criteria; it may not even disclose how it chooses them.

Likewise, contracts A and C pay off $10 if AOL, respectively, "beats" and "fails to meet" earnings expectations.

For contract purposes, the Market Authority, acting in accordance with the present invention, can define the "official" earnings number as appropriate to the needs of the hedging market. For example, the official earnings numbers may be defined as "earnings before special items" listed in the document (Form 10-K or 10-Q) officially filed with the Securities and Exchange Commission. This document is publicly available for download on FreeEdgar.com, or through sec.gov, ostensibly within 24 hours of filing. Therefore, the settlement date is on the day after Form 10-K or 10-Q is first available on FreeEdgar.com. This date is not specified as a calendar date because it depends on when AOL officially files with the SEC. However, because companies may announce their earnings before the 10-K or 10-Q is published, a Market Authority may instead define the official earnings number as whatever numbers the company provides in such an announcement.

For the purposes of this example, the expiry date T is the day after Form 10-K or 10-Q is first available through a specified source such as the web site FreeEdgar.com or sec.gov. Note that the expiry date T need not be specified as a calendar date because it depends on another event, e.g., when AOL officially files with the SEC. Sometimes a company may pre-announce earnings. However, the settlement date in the present example is based on the official SEC 10-K or 10-Q filing, not the pre-announcement or any version of company press release. Moreover, if a company later amends and re-compute earnings, the preferred embodiment of the present invention does not use the re-computed number. Thus, the payoff is preferably based on the original SEC filing.

The AOL Earnings Class: At any given time, many different earnings contract series for AOL can be trading, corresponding to the future quarterly earnings announcements. At the discrescion of the Market Authority, the series may be limited to the next four earnings report, corresponding to the reports expected over the next twelve months. Then, after one series expires, the year-ahead one for the same quarter is introduced to start trading. For instance, typically AOL would be expected to file its 4th quarter 1999 earnings with the SEC near the end of January, 2000. Immediately afterwards the Market Authority could issue a series based on 4th quarter, 2000 earnings for trading.

| Earnings Series | Trading Start | Expiry |
| --- | --- | --- |
| $4^{th}$ Qtr. 2000 | Jan. 31, 2000 | at SEC filing |
| $1^{st}$ Qtr. 2000 | Mar. 31, 2000 | at SEC filing |
| $2^{nd}$ Qtr. 2000 | Jun. 30, 2000 | at SEC filing |
| $3^{rd}$ Qtr. 2000 | Sep. 30, 2000 | at SEC filing |

However, the Market Authority is not limited to issueing a series of contract that cover approximately a twelve month time-span. Rather, at its discretion, the Market Authority may issue any series for which there is significant demand. For example, the Market Authority may issue contract series for AOL earnings over the next eight or more quarters if there is sufficient market demand for such hedging instruments.

Example 4

FOMC Interest Rate Changes

The Federal Open Market Committee (FOMC) meets eight times per year. One of the outcomes of the meetings is the setting or adjustment of the prime interest rate. For a contract bundle, or contract bundle series directed to the Federal interest rates (Fed Interest Rates), a bundle can consist of the set {A,B,C,D,E} of 5 contracts, in which:

Contract A pays off $10 if and only if the interest rate is lowered by more than 25 basis points between midnight EDT June 29, and midnight EDT Aug. 23, 2000.

Contract B pays off $10 if and only if the interest rate is lowered by exactly 25 basis points between June 29 and August 23.

Contract C pays off $10 if and only if the interest rate is unchanged between June 29 and August 23.

Contract D pays off $10 if and only if the interest rate is raised by exactly 25 basis points between June 29 and August 23.

Contract E pays off $10 if and only if the interest rate is raised by more than 25 basis points between June 29 and August 23.

Based on this example, at any given time, eight Fed Interest Rate series might be trading. These eight series correspond roughly to the eight scheduled FOMC meeting per year. After one series expires, the corresponding year-ahead one is introduced to start trading. For instance, as indicated in the schedule below, on Feb. 16, 2000 the series based on how much the Fed changes interest rates between Jan. 1, 2001 and Feb. 15, 2001 starts trading. This series trades continuously for one year until Feb. 15, 2001, the expiry date. Note that while the "rate accrual period" intends to roughly approximate the period between 2 FOMC meetings, the outcome is not based on whether the FOMC meets on those dates or not. The outcome is based on the accumulated net amount the Fed changes interests rates during the period between midnight EDT Jan. 1, 2001 and midnight EDT Feb. 16, 2001.

In this example, only eight series of contracts based on the FOMC interest rate changes are trading. However, one skilled in the art will recognize that the invention is not so limited, and that a Market Authority may issue as many series of contracts may as needed or desired based on market conditions and demand.

| Rate Accrual Period | Trading Start | Expiry |
| --- | --- | --- |
| Jan. 1, 2001-Feb. 15, 2001 | Feb. 16, 2000 | Feb. 15, 2001 |
| Feb. 16, 2001-Mar. 31, 2001 | Apr. 1, 2001 | Mar. 31, 2001 |
| Apr. 1, 2001-May 22, 2001 | May 23, 2001 | May 22, 2001 |
| May 23, 2001-Jun. 28, 2001 | Jun. 29, 2001 | Jun. 28, 2001 |
| Jun. 29, 2001-Aug. 22, 2001 | Aug. 23, 2001 | Aug. 22, 2001 |
| Aug. 23, 2001-Oct. 15, 2001 | Oct. 16, 2001 | Oct. 15, 2001 |
| Oct. 16, 2001-Nov. 22, 2001 | Nov. 22, 2001 | Nov. 22, 2001 |
| Nov. 22, 2001 v Dec. 31, 2001 | Jan. 01, 2002 | Dec. 31, 2001 |

Transactions of Type I Contracts

A full understanding of the types of transactions in the various contracts in the present invention requires an appreciation of the following terminology and concepts pertaining to market transactions involving contracts:

A "trader" is any person authorized to buy or sell, or to make offers to buy or sell, contracts or contract bundles in the market.

"Sale Of A Bundle By The Market Authority"—When the market authority authorizes a new series of contracts for trading, it stands ready to sell to traders, at any time, contract bundles pertaining to that series of contracts for a fixed price. Ignoring transactions fees, this fixed price is typically equal to the aggregate payoff of a complete bundle of contracts at expiry. By way of example, in the following discussions the fixed price is $10, however, any other value can also be used.

"Passive Redemption Of Bundles By The Market Authority"—The market authority stands ready to redeem for $10 any complete bundle of contracts offered for sale to it by any traders.

"Active Redemption Of Bundles By The Market Authority"—The market authority may, at its discretion, actively monitor the order queues and purchase every complete bundle that it can construct and buy for under $10 (e.g. for $9.75). In making such purchases, the Market Authority respects the priority of other traders' orders in the queue, and it never unfairly jumps ahead of other legitimate higher priority orders queued by traders.

"Splitting of a Contract"—The market authority may at any time elect to split any contract into two or more contracts. When a contract, for instance contract A, is designated for splitting into M contracts, say A.1-A.M, the following occurs:
- (i) The market authority announces the split and defines the payoffs of the M contracts subject to the following conditions:

If at date T, original contract A pays off $10 in state s, and $0 otherwise, then the aggregate payoff of contracts A.1-A.M at date T must also pay off $10 in state s and $0 otherwise. In this sense, owning contract A is equivalent to owning: the set of M contracts A.1-A.M.

Each of the individual M contracts must pay off either $10 or $0 at date T.

These conditions are fulfilled if the market authority partitions the state s into M mutually exclusive states $\{s1, \ldots, sM\}$ such that the union of s1, s2, ... & sM equals state s; and, then, the market authority defines contract A.j as paying off $10 if, and only if, state sj occurs, and $0 otherwise.
- (ii) The market authority replaces every contract A held in each trader's account with contracts A.1-A.M.
- (iii) All contract bundles sold in the future by the market authority contains the new contracts A.1-A.M in place of contract A.

"Merger of Contracts" The market authority may at any time elect to merge two or more contracts into a single contract. When M contracts, A.1-A.M, are designated for merger into one contract, A, the following occurs:
- (i) The market authority announces the merger, and defines the new contract A as follows. Suppose at date T the individual contracts Aj pay off $10 in state sj and zero otherwise. Define the aggregate state s as the union of states $\{s1, \ldots, sM\}$ (for j=1 to M). Then contract A pays off $10 if, and only if, at date T state s is realized; otherwise A pays $0. In this sense, owning contract A is equivalent to owning the M contract, A.1-A.M.
- (ii) The market authority replaces every set of contracts A.1-A.M held in every trader's account with contract A. Note that if a trader holds some, but not all, of the M contracts, then his contracts will not be merged and will not be replaced by contract A. Only complete sets of A.1-A.M will be replaced by A.
- (iii) All contract bundles sold in the future by the market authority will contain contract A in place of contracts A.1-A.M.
- (iv) The markets for the individual contracts Aj will continue trading until every contract Aj has been redeemed by the market authority. In the meantime, contract bundles containing original contract A will still be redeemable for $10.

"Limit Order For Purchase/Sale Of A Contract"—Traders may place limit orders to buy or sell individual contracts. A limit order to purchase a contract A is an outstanding offer to buy at a certain price for a certain period of time. Analogaously, a limit order to sell a contract A is an outstanding offer to sell at a certain price for a certain period of time. Typically a limit offer must specify:

numbers of A contracts desired, maximum/minimum price per A contract the aspiring buyer/seller is offering, and an expiration date after which the offer terminates.

Acceptance of an outstanding limit order is binding on the offeror. The order is automatically withdrawn at 12.01 A.M. on the expiration date. However, traders may cancel their limit order at any time prior to their stated expiration date by placing a cancellation order.

"Market Order For Purchase Of A Contract"—Traders may also place limit market orders to buy or sell hedging contracts. A market order is an offer to buy or sell a contract at the current market price for a certain period of time. The offer must typically specify:

numbers of A contracts desired, and an expiration date after which the offer terminates.

"Block Order For Purchase Of A Contract"—Traders may also place block orders. Typically, such orders are arranged outside of the market and are for the sale or purchase of large numbers of contracts. Although the block order may be pre-arranged, the market is used to facilitate the actual block order transaction. are transacted through the market.

Acceptance of an outstanding limit order is binding on the offeror. However, traders may cancel their limit order at any time prior to their stated expiration date by placing a cancellation order.

Description of Type I Contract Markets

Consider a given series of contracts. Suppose this series of contracts consists of bundles of N contracts each. Then at any given time, there will be N distinct parallel markets—one market for each of the N contracts.

At any given instant before expiry, any one of these N markets will consist of the following:
- a market authority who stands ready to sell and redeem a bundle of N contracts for a predetermined price, for example $10 per bundle,
- a collection of traders' accounts qualified to transact in this market; that is, a collection of accounts qualified to place limit and buy orders on these contracts,
- a queue of limit orders to buy contracts. The queue can be arranged in priority according to any one of (or more than one) the following criteria in order of importance:
    - (i) price per contract (highest order first)
    - (ii) number of contracts offered (greatest quantity first)
    - (iii) time order was entered (earliest order first)
- a queue of limit orders to sell contracts. The queue can be arranged in priority according to any one of (or more than one of) the following criteria in order of importance:
    - (iv) price per contract (lowest price first)
    - (v) number of contracts offered (greatest quantity first)
    - (vi) time order was entered (earliest order first), and
- a mechanism for communicating to all traders' accounts timely information about the status of the market, including the price and volume information of recent trades, and the best limit prices and quantities in the limit buy and sell queues.

Use of Type I Contracts

Suppose there are N states of nature $\{s1, s2, \ldots, sN\}$ which comprise a complete set of possible outcomes of an event. This means the ultimate outcome of the event must be either s1, s2, ..., or sN. Consider a potential hedger-who can be anyone from a large corporation to a private individual—who finds herself in a risky position that pays off Q(sn) dollars in state sn. Q(sn) may be negative or positive. Without loss of generality, suppose these payoffs are arranged in order of size so that $Q(s1) > Q(sn)$ for all $n > 1$.

Without hedging, this potential hedger cannot guarantee herself of a certain outcome, and she would be at the mercy of whatever outcome sn and payoff Q(sn) that befalls her.

But suppose there is a bundle of futures contracts #1, #2, . . . , #N which are available. These contracts respectively pay $10 if and only if state s1, s2, . . . , sN occurs. To completely hedge her position and guarantee herself a riskless position, this hedger should buy:
(a) {Q(s1)−Q(s2)}/10 shares of contract #2.
(b) {Q(s1)−Q(s3)}/10 shares of contract #3
(z) {Q(s1)−Q(sN)}/10 shares of contract #N.

This position assures the hedger a completely riskless net profit (after paying for the contracts) of:

$$p=p(s1)Q(s1)+p(s2)Q(s2)+ \ldots +p(sN)Q(sN) \quad \text{(Eq 1)}$$

This use of Type I contracts will be more fully understood after considering the following examples:

Hedging Method Example 1

Earnings Announcements

As described above, an earnings announcement contract pays off based on whether a company's quarterly announcement "beats," "meets," or "misses" a benchmark (or "expected") earnings number. For any particular earnings announcement, the Market Authority would offer, for $10, a bundle consisting of a set {A,B,C} of 3 contracts which pay $10 if and only if AOL's earnings exceed, meet, or fall below the expected earnings.

Suppose an investor, Pete, holds a $100,000 long position in AOL stock. While Pete is optimistic about AOL long term, Pete is concerned about short term volatility in the AOL stock price. (Perhaps Pete manages a hedge fund, and short term volatility would scare away his clients; or perhaps Pete is highly margined, and price volatility might make Pete liable to a margin call.) In any case, AOL is due for an earnings announcement, and Pete is worried that if AOL does not beat expectations, AOL stock will fall. In particular, Pete believes his unhedged AOL portfolio would be worth one of the following:
(a) $125,000 if 1st Qtr earnings exceeds $0.41 cents;
(b) $95,000 if 1st Qtr earnings falls within $0.39-$0.41 range;
(c) $85,000 if 1st Qtr earnings misses the $0.39 expectations threshold.

Thus, to fully hedge his position, Pete, using Eq. 1, would buy the following contracts:
(i) 3000 type B contracts=(125,000−95,000)/10; and
(ii) 4000 type C contracts=(125,000−85,000)/10.

Then regardless of whether AOL beats, meets, or fails to meet earnings expectations, the value of Pete's hedged portfolio is locked in at $100,000 after the earnings announcement.

To put some numbers on the consequences of Pete's hedging position, suppose, for instance, the market believes AOL has a 25% chance of beating expectations, a 50% chance of meeting expectations, and a 25% chance of falling short of expectations. Then Pete would pay $15,000 (=3000×$10× 0.50) for 3000 type B contracts, and $10,000 (=4000×$10× 0.25) for 4000 type C contracts—for a total upfront payment of $25,000.

While the expected value of the Pete's portfolio is $100, 000, without hedging the realized value after the earnings announcement could be anywhere from a high of $125,000 to a low of $85,000. So Pete's unhedged portfolio is potentially volatile.

However, with hedging, after the earnings announcement, Pete's portfolio net the $25,000 upfront payment would be:

| Initial Value Of Pete's Portfolio | Upfront Payment For B & C Contracts | Change In Value | Payoff Of Contract Portfolio | Net Final Value Of Pete's Portfolio |
|---|---|---|---|---|
| 100,000 | −25,000 | +25,000 | 0 | 100,000 |
| 100,000 | −25,000 | −5,000 | +30,000 | 100,000 |
| 100,000 | −25,000 | −15,000 | +40,000 | 100,000 |

The first row of numbers show Pete's situation if AOL beats earnings. In this event, Pete's B & C contracts are worthless, but Pete recovers his original $25,000 investment for the B & C contracts because the value of his AOL stock increases by $25,000. The second and third rows of numbers show Pete's outcome if AOL does not beat expectations. If AOL meets or fails to meet earnings expectations, Pete recovers his initial investment in the contracts plus the drop in value of his portfolio, because the B & C contracts pay off in the exact compensating amounts.

Therefore, once hedged, Pete is guaranteed a riskless outcome of $100,000 after netting out the original upfront investment.

What happens if the Market Authority made a mistake and issued contracts based on wrong earnings expectations?

Suppose the market expects, as in the preceding setting, AOL to report earnings in the $0.39-$0.41 range. However, the Market Authority over-estimates market expectations for AOL's earnings, and issues for $10 the following bundle {D,E,F} of 3 contracts instead of {A,B,C}:
Contract D pays off $10 if and only if AOL's 1st Qtr earnings (before special items) exceeds $0.61 (rounded to the nearest penny) per share.
Contract E pays off $10 if and only if AOL's 1st Qtr earnings (before special items) falls within the range $0.59-$0.61 (rounded to the nearest penny) per share.
Contract F pays off $10 if and only if AOL's 1st Qtr earnings (before special items) falls below $0.59 (rounded to the nearest penny) per share.

First, the market would pay virtually nothing for contracts D and E, and almost $10 for contract F.

Can Pete still hedge his portfolio with {D,E,F}? Unfortunately, not. Contracts D and E are useless to Pete, because all the volatility in Pete's portfolio occurs in the earnings range of $0.39-$0.41. Contracts {D,E,F} cannot distinguish between whether AOL meets $0.39-$0.41 or not. So these contracts do not enable Pete to hedge his risk.

However, the existence of contracts {D,E,F} do not make Pete worse off. After all, Pete can always choose not to participate. There is no reason for Pete to buy {D,E,F} so Pete would probably just not take positions on these contracts. Pete is not made worse off by the mere existence of these contracts, since he can always ignore them.

Another Application of the AOL Earnings Contracts

In the previous example the hedger, Pete, was an AOL investor. We do not want to leave the impression that only financial market investors could use AOL earnings to hedge risks. Indeed, anybody with AOL-related business risk, including AOL's creditors, employees, suppliers, customers and even competitors, will find AOL earnings contracts useful for hedging.

Consider a small company, Sysco. Suppose Sysco is a supplier of operating hardware to AOL's network headquarters in Virginia. In fact, AOL is Sysco's single largest customer. When AOL's business booms, AOL will order more hardware from Sysco. In slower times, AOL will reduce its orders. In either case, Sysco believes AOL's quarterly earnings announcements reflect how well AOL is doing and, accordingly, how much AOL will expand or reduce needs for Sysco's products. In particular, Sysco believes the net present value (NPV) of its AOL business, if unhedged, would change by:

(a) $1,250,000 if AOL 1st Qtr earnings exceeds $0.41 cents;
(b) $950,000 if AOL 1st Qtr earnings falls within $0.39-$0.41 range;
(c) $850,000 if AOL 1st Qtr earnings misses the $0.39 expectations threshold.

To fully hedge its business risk, Sysco would buy from the Market Authority:

(i) 30,000 type B contracts=(1250 K−950 K)/10; and
(ii) 40,000 type C contracts=(1250 K−850 K)/10.

To put some numbers on the consequences of Sysco's hedging position, suppose, for instance, the market believes AOL has a 25% chance of beating expectations, a 50% chance of meeting expectations, and a 25% chance of falling short of expectations. Then Sysco would pay $150,000 (=30000×$10×0.50) for 30000 type B contracts, and $100,000 (=40000×$10×0.25) for 40000 type C contracts—for a total upfront payment of $250,000.

The expected value of the Sysco's AOL business is $1,000,000. But after the earnings announcement the realized value could be anywhere from a high of $1,250,000 to a low of $850,000. So Sysco's unhedged business risk is potentially volatile.

With hedging, after the earnings announcement, Sysco's portfolio net the $250,000 upfront payment would be:

| Initial Value Of Sysco's Portfolio | Upfront Payment For B & C Contracts | Change In Value | Payoff Of Contract Portfolio | Net Final Value Of Sysco's Portfolio |
|---|---|---|---|---|
| 1,000,000 | −250,000 | +250,000 | 0 | 1,000,000 |
| 1,000,000 | −250,000 | −50,000 | +300,000 | 1,000,000 |
| 1,000,000 | −250,000 | −150,000 | +400,000 | 1,000,000 |

Hence, no matter if AOL beats, meets, or fails to meet earnings expectations, the value of Sysco's hedged portfolio is locked in at $1,000,000 after the earnings announcement. As Sysco, all of AOL's individual suppliers, programmers, employees, and third-party contracts may use AOL earnings announcements to hedge their AOL-related business risk.

Hedging Method Example 2

FOMC Interest Rate Changes

As discussed above, an FOMC contract bundle could consist of a set {A,B,C,D,E} of 5 contracts, which would sell for $10 (plus any transactions fee) and pay $10 if the interest rate is, respectively, lowered by more than 25 basis points, lowered by exactly 25 basis points, unchanged, raised by exactly 25, or raised by more than 25 basis points.

Suppose a retailer, Widco, sells things on credit and typically carries $1,000,000 worth of receivables on its books. Since Widco does not ask for any interest payments on those receivables, they are essentially a continuously stream of interest-free loans to Widco's customers. Whenever interest rates move up, Widco is incurring additional loss of interest payments on these interest-free loans. (In other words, whenever interest rates go up Widco faces a higher cost of doing business while its credit customers do not pay any extra interest for their credit line.) Widco would prefer to lock in a constant interest rate so that its profits are more predictable. In particular, Widco believes its unhedged change in earnings between August 24-October 15 would be:

(a) $50,000 under a 50 basis point rate decrease;
(b) $25,000 under a 25 basis point rate decrease;
(c) $0 if the rate does not change;
(d) −$25,000 under a 25 basis point rate increase;
(e) −$50,000 under a 50 basis point rate increase.

To approximately hedge its interest rate risk exposure, following the Hedging Recipe (Eq. 1) given above, Widco would buy from the Market Authority:

(i) 2500 type B contracts=(50,000−25,000)/10;
(ii) 5000 type C contracts=(50,000−0)/10;
(iii) 7500 type D contracts=(50,000+25,000)/10; and
(iv) 10,000 type E contracts=(50,000+50,000)/10.

To put some numbers on the consequences of Widco's hedging position, suppose, for instance, the market believes there is a 35% chance of a 50 basis point decrease, 40% chance of a 25 basis point decrease, and a 19% chance of no change, a 5% chance of a 25 basis point increase, and a 1% chance of a 50 basis point increase. Then Widco would pay $10,000 (=2500×$10×0.40) for 2500 type B contracts; $9500 (=5000×$10×0.19) for 5000 type C contracts; $3750 (=7500×$10×0.05) for 7500 type D contracts; and $1000 (=10,000×$10×0.01) for 10000 type E contracts—for a total upfront payment of $24,250.

The expected value of Widco's contracts is $1,025,750; but the realized value could be anywhere from a high of $1,050,000 to a low of $950,000. So Widco's unhedged business risk is potentially volatile.

With hedging, after the earnings announcement, Widco's portfolio net the $24,250 upfront payment would be:

| Initial Value Of Widco's Receivable | Upfront Payment For B-E Contracts | Change In Value Of Widco's Receivable | Payoff Of Contracts In Hedge Portfolio | Net Final Value Of Widco's Portfolio |
|---|---|---|---|---|
| 1,000,000 | −24,250 | 50,000 | 0 | 1,025,750 |
| 1,000,000 | −24,250 | 25,000 | 25,000 | 1,025,750 |
| 1,000,000 | −24,250 | 0 | 50,000 | 1,025,750 |
| 1,000,000 | −24,250 | −25,000 | 75,000 | 1,025,750 |
| 1,000,000 | −24,250 | −50,000 | 100,000 | 1,025,750 |

The first row of numbers show Widco's situation if the interest rate falls by 50 basis points. In this event, Widco's futures contracts are worthless, but Widco recovers its original $24,250 hedging cost because the value of its receivables increases by $50,000. Likewise, the other rows show Widco's outcome if the interest rate decreases by 25 basis points or less, remains the same, or increases. In these cases, Widco's receivables is changes in value, but the value of the Widco's hedge portfolio of contracts exactly compensates for Widco's initial investment of $24,250 plus the change in value of the receivables.

In summary, regardless of whether the Fed raises or lowers interest rates, the value of Widco's hedged receivables portfolio is locked in at $1,025,750—the ex ante expected value of its receivables portfolio.

Hedging Method Example 3

Real Estate Market

Assume Myron has a house currently worth $400,000 in a San Francisco suburb. He is concerned that the housing market is overheated and may fall by as much as 25%. Exactly how can Myron use a contract bundle to protect himself from this $100,000 exposure? Further assume that a Market Authority has issued contract bundles {A,B} based on changes in the real estate index of the San Francisco Bay Area (SFI), where:

(A) Contract "A" pays off $10 if and only if the SFI does NOT decrease by more than 0.50 points compared to the previous year.

(B) Contract "B" pays off $10 if and only if the SFI decreases by more than 0.50 points compared to the previous year.

If Myron estimates that there is a 20 percent probability of the SFI falling by more than 0.5 points, his position value is:

| Position Value: | Probability |
| --- | --- |
| (i) $420,000 if the SFI does NOT decrease by more than 0.50 points | 0.80 |
| (ii) $320,000 if the SFI does decrease by more than 0.50 points | 0.20 |

Initial expected=0.80×$420,000+0.20×$320,000=$400,000

To fully hedge his position, he would buy from the Market Authority: [$420,000−320,000]/10=10,000 type "B" Hedging instruments at a price of $2.00 per Hedging instrument for a total of $20,000

Final Hedged Position:

| Initial expected value of home | Upfront payment for B Hedging instruments | Change in home value | Payoff of Hedging instrument | Net final hedged value of home |
| --- | --- | --- | --- | --- |
| $400,000 | −$20,000 | +$20,000 | $0 | $400,000 |
| $400,000 | −$20,000 | −$80,000 | +$100,000 | $400,000 |

Hedging Method Example 3

Becoming Unemployed

Assume, Fisher is a blue-collar worker who is worried about being laid off from the local GM plant in Lansing, Mich. due to uncertainty in car sales. Fisher makes $40,000 per year and is concerned about that he may be laid off. He believes that there is a 25 percent chance that car sales will drop by more than 3% in the next three months, which would result in his layoff. He also estimates that it would take three months for him to find another job.

| Income | Probability |
| --- | --- |
| $10,000 if car sales do not fall by more than 3% (3 months salary if Fisher is not laid off) | 0.75 |
| $2,000 if car sales fall by more than 3% (3 months of unemployment insurance) | 0.25 |

Expected income=0.75×$10,000+0.25×$2,000=$8,000

In accordance with the principles of the present invention, Fisher may use hedging instruments to hedge his perceived $10,000 exposure?" For example, suppose a Market Authority offers the a binary contract based on whether U.S. car sales fall by more than 3% in the next 3 months. That is the Market Authority issues two contracts:

contract "A" that pays off $10 if and only if US car sales do NOT fall by more than 3%; and contract "B" that pays off $10 if and only if US car sales do fall by more than 3%

Fisher could fully hedge his position by purchasing from the Market Authority: ($10,000−$2,000)/ $10=800 type "B" Hedging instruments at a price of $2.5 per Hedging instrument for a total of $2,000. Fischers final hedged position would then be as provided below:

| Initial expected 3-month income | Upfront cost for 800 B Hedging instruments | 3-month income | Value of Hedging instruments at expiration | Net final hedged income |
| --- | --- | --- | --- | --- |
| $8,000 | −$2,000 | $10,000 | $0 | $8,000 |
| $8,000 | −$2,000 | $2,000 | $8,000 | $8,000 |

Hedging With Contract Splitting

Note that even without hedging, given the implied probabilities, the ex ante expected value of the hedger's position is p. Hedging does not improve or—absent transactions cost—lower the expected value of a hedger's position.

What hedging does is change the hedger's actual or realized outcome—which could have varied between Q(s1) down to Q(sN)—to a guaranteed, riskless outcome of p dollars. In other words, hedging changes the hedger's position from a risky one to a riskless one.

This hedging method is not negatively affected by the possibility of splitting and merger since splitting and merger does not affect a hedger's position as long as the hedger does not sell any of the post-split contracts.

Suppose contract bundles comprised of four contracts each are issued pertaining to the earnings announcement of Company A in the year-ahead quarter where:

Contract A: payoff $10 if earnings exceeds $0.30
Contract B: payoff $10 if earnings fall within ($0.05,$0.30)
Contract C: payoff $10 if earnings fall within ($0.00,$0.05)
Contract D: payoff $10 if earnings are negative.

The payoff ranges very coarse here because it is hard to predict with any precision earnings 1 year ahead.

However, nine months later, there will be much more information about A's earnings. Accordingly, the market will be in a position to differentiate between contracts based on a finer payoff structure. Suppose at that time that analysts' consensus expects that earnings will be $0.25. Then splitting contract B into five contracts gives the market a way to bet on a finer payoff structure, as follows:

(i) Continue trading contracts A, C, D (they will have very little value).

(ii) Split contract B into 5 contracts where:
B1: pays off $10 if earnings fall between ($0.05,$0.10)
B2: pays off $10 if earnings fall between ($0.10,$0.15)
B3: pays off $10 if earnings fall between ($0.15,$0.20)
B4: pays off $10 if earnings fall between ($0.20,$0.25)
B5: pays off $10 if earnings fall between ($0.25,$0.30)

In the above approach, following the split, contract B no longer exists. Instead, everyone who owned contract B now owns five contracts, B1-B5 and can sell off, piecewise, any subset of B1-B5 they do not want.

Thus, after the splitting process, there are eight contracts trading: A, C, D and B1-B5; these eight contracts form a bundle.

At the discretion of the market authority, splitting can occur at any time depending on the development of events. The number of new contracts created by a split is again at the discretion of the market authority. No existing contract owners are hurt by splitting since if they keep all the new contracts after the split, their post-split position is exactly the same as their original one. Indeed, owners benefit by a split since they have the option to sell away the post-split contracts they don't want and, by doing so, refine their position(s).

Hedging With Contract Merging

Suppose contract bundles comprised of four contracts each are issued pertaining to the earnings announcement of Company A in the year-ahead quarter where:

Contract A: payoff $10 if earnings exceeds $0.30
Contract B: payoff $10 if earnings fall within ($0.05,$0.30)
Contract C: payoff $10 if earnings fall within ($0.00,$0.05)
Contract D: payoff $10 if earnings are negative.

As in the previous example, nine months later, there will be much more information about A's earnings. Accordingly, the market will have different expectations based on the new information. Suppose at that that time analysts' consensus expects that earnings will be $0.35. Then contracts B, C, and D will be nearly worthless as the odds of them paying off $10 is slim. Suppose B, C, and D at that time, respectively, trade for $0.10, $0.05, and $0.01. Moreover, in view of the high likelihood of them paying off $0 at expiry, owning them is highly speculative and, accordingly, they will not be very liquid.

To ameliorate this situation, the market authority can do the following:

(i) Split Contract A into five contracts where:
A1: pays off $10 if earnings falls between ($0.30,$0.32)
A2: pays off $10 if earnings falls between ($0.32,$0.34)
A3: pays off $10 if earnings falls between ($0.34,$0.36)
A4: pays off $10 if earnings falls between ($0.36,$0.38)
A5: pays off $10 if earnings exceeds $0.38.

(ii) Merge contracts B, C, D to form one contract, E. Upon merger, contract E will be worth $0.16, the sum of the values of contracts B, C and D. Contracts B, C, and D continue trading since traders who own only one or two of these three contracts, but not all three, cannot trade their contracts in for an E contract. (If they want to trade for an E, they must first purchase in the open market contracts to form a complete set of three contracts.)

Thus, immediately after the split and merger procedures, there are nine contracts actively trading: A1-A5, B, C, D and E; however, new bundles are comprised of the six contracts A1-A5, and E. Thus a trader can redeem $10 for either a bundle comprised of A1-A5 and E; or a bundle comprised of A1-A5 and B, C, and D.

At the discretion of the market authority, merger can occur at any time depending on the development of real events. The number of contracts merged into a single contract is again at the discretion of the market authority. No existing contract owners are hurt by merger since if they keep all the new contracts after the merger, their post-merger position is exactly the same as their original one. Indeed, owners benefit by a merger since merger converts illiquid "penny" contracts into a bigger, usually more liquid contract.

B. Type II ("Coupon") Contracts

As the name suggests, coupons contracts (or simply "coupons") are future contracts which may be redeemed for a service, product, or ticket (or some combination thereof, which may itself be a choice of the redeemer). As specified on a contract-by-contract basis, the redemption date or period may be set or vary depending on the choice of the coupon holder. Unlike Type I "event" contracts, the payoff of coupon contracts may be fixed, or they may be chosen by the coupon holder from a set of pre-specified possibilities. Moreover, the settlement date for a coupon contract may be at the coupon holder's choice. For instance, a coupon for a restaurant meal, by design, may be redeemable anytime in February for any meal on the restaurant's menu. A simple scenario follows to illustrate the value of such coupon contracts.

In January 2001, a user purchased nonrefundable San Francisco Symphony tickets for a Stravinsky concert to be held on Feb. 22, 2001. Unfortunately, the user later needed to be out of town that day. While the San Francisco Symphony does permit ticket exchanges (for a $10 fee), as it turns out, all of the San Francisco Symphony concerts of interest to the user for the remainder of the season were sold out. Hence, the user did not exchange the tickets, and took a 100% loss on the original amount paid. This unfortunate episode will make the user hesitant to buy advance tickets in the future.

Coupons settle with the physical delivery of the underlying good or service. They are essentially continuously tradable claim checks, or continuously tradeable newspaper coupons—if newspaper coupons were tradeable (which they are currently not). Coupons may be American or European in style. For instance, a car wash coupon, if American, would be redeemable (at the holder's option) for a car wash at any time. Alternatively, the holder may choose to hold the coupon exclusively for trading purposes.

It should be emphasized that what distinguishes these coupons from traditional newspaper clip out coupons is that every coupon will be continuously traded in a pre-defined market. In this respect, coupons are more like futures contracts than illiquid newspaper clip out coupons or even their electronic new age cousins. As a result, the value of a coupon is not strictly tied to liquidation—some coupon holders, either hedgers or speculators, may be holding coupons purely for resale into the market. This illustrates how coupons commodify risks in new dimensions.

Part of the preferred embodiment of the present invention includes creating markets for the promotion, sales, distribution, and exchange (trading) of coupons. Coupons can be claims on any product or service. Preferably, coupons are claims on any product or service with an established brand, because the brand reassures coupon buyers of quality and fair play by the producer. Potential products include new books, wine, electronic goods, office supplies, and homes in new housing developments. Coupons can also be created for any other standard event, including four star restaurant meals, hotel rooms, time share vacations, airline tickets, theatre and Super Bowl tickets, any sports event ticket, cruise and vacation tickets, and even Time Square hotel rooms on New Year's Day.

Transactions with Type II Contracts

While the characteristics and use of Type II (Coupon) contracts will be discussed further, a full understanding of the types of contracts and the present invention requires an appreciation of the following terminology which is used throughout this application:

The "Promoter," similar to the "Market Authority" is the official agent charged with the absolute authority and ability—subject to legal limitations—to issue, expire, terminate, buy, sell, or otherwise alter the nature of the instruments trading in the market, and the market itself.

A "coupon" is a tradable instrument which pays off, at expiry, a prespecified item of value, which can be anything including goods or services. For example, the payoff may be a ticket, an option to buy a ticket at a predetermined price, a night in a hotel, an option to buy one ticket, and option to buy a ticket to one of two concerts.

"Expiry" refers to the period or time when the coupon may be redeemed for the payoff object.

Frequently, one may have otherwise identical coupons whose only difference is their expiry. For example, Hotel Chain A may sell "one night stay" hotel room coupons, some which are redeemable only in January, some only in February, some only in March, and so forth. In order to guarantee that its rooms are not oversubscribed in January, the hotel would not allow redemption of the March coupons in January or vice versa. The collection of all these coupons would be the "one night stay class for Hotel Chain A." All coupons in this class with the same expiry period would be referred to as the "Month T coupon series" of that class. For instance, "the July series coupon of Hotel Chain A" refers to the coupons redeemable for a one night stay in Hotel Chain A during July.

In the following, several examples of Type I (Coupon) contracts are described and the manner in which each allows risk to be hedged explained.

Example 1

Coupon for a Concert Ticket

The Grasshoppers plan to tour the U.S. in September. In every city, the promoters face demand risks. How many nights can San Francisco support? Is a 30,000 seat stadium big enough, or is there enough demand to justify a 55,000 seat stadium? A related risk is price risk; what is the most that fans are willing to pay? Can promoters clear a bigger net profit by doubling ticket prices? How can promoters foil scalpers?

Potential ticket buyers also face risks. If a customer buys a ticket in January, what if he has an unexpected plans change and cannot go? It is too much trouble (if not illegal) to try to scalp the ticket. On the other hand, if the customer waits until August to buy a ticket, all the good seats will be gone. At that time, scalpers will be charging a premium for the few remaining seats.

The apparatus and method according to the present invention provides a solution which is to sell tradable coupons. Tradable coupons eliminate the liquidity risks faced by early ticket buyers. Buyers who can't go can easily resell their coupons into the market at the fair, competitive market price. Simultaneously, tradable coupons reduce risks faced by promoters by:

Allowing promoters to pre-sell tickets earlier since buyers with no liquidity risk will be more willing to buy earlier and pay more;

Allowing promoters to monitor the trading prices of their tickets, and hence obtain information about market demand and pricing, which they can use to set future prices and marketing strategies; and Eliminating scalpers and other inefficiencies in the ticket supply chain.

If the Grasshoppers are holding a series of concerts around the country, then they would issue a new class of coupons, one for each city. If they hold more than one concert in a given city, then they will then issue a series of coupons for that city, one for each concert. For example, to see the Grasshopper's second concert in San Francisco, one would buy the "Grasshopper-San Francisco class coupon, series #2" coupon.

Example 2

Coupon for a McDonald's® Meal

As part of its marketing strategy, McDonalds® Restaurant issues a series of coupons which are redeemable for a "Complete Meal" consisting of a Quarter Pounder®, a Super Size® fry, an apple pie, and a large soft drink. The series of coupons are monthly, and are issued 3 months ahead of their expiration month. This means that on March 1st, the March, April, and May coupons have been issued, and are trading. The March coupon may be redeemed at any participating McDonalds in March. Likewise, the April and May coupons may be redeemed, respectively, at any participating McDonald's during April and May. (Note: McDonald's® and Quarter Pounder®, are registered trademarks and Super Size® is a registered service mark of McDonald's Corporation.)

McDonald's benefits from using these coupons in several ways:

(i) Since it gets cash up front when the coupons are originally sold, the coupons give McDonald's more control of its cash flow.

(ii) The trading activity and prices on the coupons help McDonald's to gauge the demand curve for its meals three months in advance. This insight into future demand assists McDonald's in managing its inventory and marketing strategy.

(iii) Coupon trading and redeeming coupons stimulates interest in eating at McDonald's.

(iv) Once a coupon is sold, McDonald's realizes the profit even if the coupon later expires unredeemed.

Consumers benefit from trading coupons because the consumer is able to lock in meal prices at an earlier date. Tradable coupons are also good gifts, since the receiver may easily sell them in the market if she doesn't wish to eat at McDonald's.

Example 3

Coupon for a Pre-Paid Holiday Inn® Hotel Room

Hotels have trouble because their customers don't like them to re-adjust their prices and charge a premium during seasonal peak periods. For instance, the price for a Holiday Inn® hotel room does not fluctuate much during the year, although demand for rooms fluctuates a lot. Clearly, hotels would benefit if they could sell their rooms at a fair market value that floats with demand. (Note: Holiday Inn® is a registered service mark of Holiday Inns, Inc.)

Customers do not like to put down money for "guaranteed" rooms ahead of time because they might have unforeseen plan changes and not be able to use the room. So customers would benefit by an option to easily resell an unneeded reservation.

Each Holiday Inn hotel could sell its own series of coupons. Each coupon would entitle the holder to a one-night stay in that Holiday Inn on a specific date. If Holiday Inn wants to allow year-ahead reservations, then it would have a series of 365 coupons, one coupon for each day of the year. Every day, one of the coupons in the series would expire, and the hotel would issue a new coupon for the same day, one year ahead. Note that the hotel does not need to offer every available coupon for a date for sale all at once; it could sell a fraction of the coupons, get a feel for what prices the market is willing to pay, and then sell more at the new market price.

Example 4

Advance Purchase Order for a Christmas Toy

Producers and developers of new cars, Broadway plays, and condominiums must risk incurring huge up front costs without knowing the ultimate demand for their product. The apparatus and method of the present invention can create markets for the promotion, sales, distribution, and trading of claim checks on advance sales items. Such prepaid claim checks will be referred to hereinafter as Advance Sales Coupons (ASCs). It should be noted that these markets can either be within a web portal operated by a hedging service, or be part of the producer's own web site, in which case the hedging service will be acting as a co-brander and consultant.

ASCs can be designed for any product. Preferably ASCs are designed for a product with an established brand. The brand reassures ASC buyers of quality and fair play by the producer. Such products include groceries, new books, wine, electronic goods, shoes, office supplies, designer dresses, and homes in new housing developments.

In one aspect of the present invention, a hedging service, which may operate a computer network system for selling and exchanging hedge instruments, would charge manufacturers and producers an up-front sales and distribution fee for providing a distribution channel for their ASCs. Optionally, the hedging service can levy a per-trade transactions fee on ASC buyers and traders.

Selling tradable ASCs enables these producers to spread their demand risk with their potential customers. Also, the market demand for their ASCs provides probably the best information to the producers about actual market demand for their product. In return for being willing to assume some of the producer's risk when a customer buys an ASC, customers get a slightly lower price for that new car, movie ticket, or condo than they would otherwise get by waiting.

Selling tradable ASCs is also a way for producers to finance the production of their product. ASC financing may be superior to debt or equity financing, especially if the amount of funds needed is small—too small to justify going through traditional banking paperwork.

Historically, customers assume two kinds of risk if they make an advance purchase order: (i) liquidity risk: risk that their situation may change, and they do not have the time, money, or inclination to use the book, movie, or condo when it is ready for consumption two years later; (ii) information asymmetry risk: risk that they are being duped by the promoter into committing to buy a flop.

By making ASCs tradable, the system and method of the present invention reduces or eliminates liquidity risk faced by consumers. If an ASC holder's situation changes, she can liquidate her ASC for a fair price. Because of their liquidity, consumers are empowered to buy more ASCs for books, movies, and condos they might want to buy two years down the road.

The system and method of the present invention also reduces information asymmetry risk by establishing a market price for the ASCs. Customers who feel they are naive about the potential quality of a new product will be reassured by an established market price for the ASCs. This is because, by market efficiency, market prices reflect the consensus expectation for the product based on the best publicly available information. Note that producers can also use information in the market price of the ASC to determine if they need to improve the quality of their final product (e.g. hire a better leading lady for their movie).

As a result, producers and consumers both benefit from ASCs. For example, retailers like Amazon or Walmart face much uncertainty when planning their inventory orders several months ahead for the Christmas Shopping season. What will be the "blowout" toy next Christmas? If it becomes very popular, will my toy maker be able to make them fast enough on short notice? Will the manufacturer raise wholesale prices at the last minute? How much of this toy should they buy for inventory? Also, Amazon would like to generate more cash flow in the off-season to run operations and pay salaries.

Given this situation, Amazon would greatly benefit if it could effectively spread the Christmas shopping season over the whole year. (Spreading shopping interest throughout the year potentially also increases aggregate shopping interest and hence sales—it has spillover revenue-enhancement benefits.) However, shoppers face risks if they buy their Christmas gifts too early. If one buys a Barbie doll in March, how do they know their daughter will still want it in December? Maybe she will develop an interest in piano, in which case the better gift would be some music books.

By establishing a market in Christmas gift ASCs (a distinct ASC series for each toy or toy category), the system and method of the present invention addresses both Amazon's and shoppers concerns. Amazon can generate cash flow throughout the year by selling new ASCs into the market. The ASCs' trading prices tells Amazon the market's anticipated demand for various toys during Christmas. Customers will be willing to buy ASCs for specific toys in February since they can also resell them back if they change their mind about a toy.

ASCs can be created for any product or bundle of products. For instance, Amazon might sell a booklet of ASCs (one ASC for a Barbie, another ASC for a book, another for a radio, etc.). Amazon could sell the whole booklet at a package discount steep enough to attract buyers. Buyers can then keep the ASCs they want, and re-sell the other ASCs in the thus created market. Booklets are a good way for Amazon to stimulate sales volume.

Example 5

Advance Sales Coupon for New Car

In the Amazon example above, the coupon was for redemption of a product already in existence. ASCs can also be sold for yet-unproduced items, such as new books, new movies, new wines, or new cars.

For example, suppose Ford is introducing a new luxury line of Sky Spirit automobiles. Ford's risk is that market demand is volatile, but Ford cannot quickly respond to unexpected changes in demand since it takes 5 months to aggregate raw materials and manufacture each car from scratch. Sometimes, Ford has produced too many cars, which then must be sold at a discount. Other times, Ford has produced too few cars, and lost the opportunity to sell more cars and at higher profit margins.

On the other side of the transaction, customers do not like to commit to buying a car many months before delivery because of fashion and liquidity risk—not to mention natural procrastination. If it is a brand new line, the line may turn out to be a lemon. Tradable Sky Spirit ASCs help solve both Ford and the customers' concerns.

Economic Benefits of Tradable Coupons

Selling tradable coupons enables producers or goods and services to share the risk of future low demand for their goods or services with their customers. Also, the market price for their coupons provides probably the best information to the producers about actual market demand for their product. In return for willingness to assume some of the producer's risk when a customer buys a coupon, customers would get a better market price on the coupon than they would if they wait to buy the good or service at the last minute.

Selling tradable coupons is also a way for producers to finance the production of their product. Coupon financing may be superior to debt or equity financing, especially if the amount of funds needed is small—too small to justify going through traditional banking paperwork.

For instance, producers and developers of music events, Christmas gifts and new cars risk incurring huge up front costs without knowing the ultimate demand for their product. Absent tradable coupons, customers would assume two kinds of risk if they file a traditional advance purchase order:
  liquidity risk: risk that their situation may change, and they do not have the time, money, or inclination to use the book, movie, or condo when it is ready for consumption later;
  information asymmetry risk: risk that they are being misled by the promoter into committing to buy a flop.

By making coupons tradable, the system and method of the present invention eliminates liquidity risk faced by consumers. If the situation of a coupon holder changes, she can liquidate her coupon in the thus formed market for a fair price. Because of the liquidity of the coupons, consumers are empowered to buy more coupons for books, movies, condos, and other goods and services they might want to buy down the road.

The system and method of the present invention also reduces information asymmetry risk by establishing a market price for the coupons. Customers who feel they are unsure about the potential quality of a new product will be reassured by an established market price for the coupons. This is because, by market efficiency, market prices reflect the consensus expectation for the product based on the best publicly available information. Note that producers can also use information in the market price of the coupon to determine if they need to improve the quality of their final product (e.g., hire a better leading lady for their movie). As a result, producers and consumers both benefit from coupons.

For instance, in regard to the example above for sales of Grasshopper concert tickets, Promoters would benefit from a system in accordance with the apparatus and methods of the present invention in the following way. The Promoter can "test" the market by putting up, say, 5000 futures coupons for sale in January for "IPO" price of $25. Suppose the original IPO batch trades at a market price of $38 in February. Then the promoter can slowly offer additional coupons for sale at the new market price ($38). At the same time, the promoter can also adjust his retail advertising campaign to try and improve the market price. The promoter might choose to ultimately sell all or just a fraction of the seats via our futures market. (Of course, the promoter will have trouble selling tickets for higher than the price buyers can get from the futures market.)

The promoter benefits since the continuous market action informs the promoter about the demand for his product, and thus how much consumers are willing to pay. Consumers, in turn, are more willing to buy futures in January since they can easily resell (perhaps even at a higher price) if they change their mind about attending. If sales go well (or not), the promoter might even be able to move the concert to a bigger or smaller stadium. Finally, the market puts third party scalpers out of business.

Similarly, consumers benefit in the above-described situation. Consumers will be eager to buy their seats in January at the lower IPO price, since they can always resell later if they cannot attend the concert. Latecomers also benefit from the market price, since they can always buy from the market by meeting the latest ask price. Effectively, the concert is never sold out since one can always buy a ticket by meeting the then-prevailing market ask price.

Description of Type II Contract Markets

The following terminology and concepts pertain to market transactions involving Type II contracts. It will be appreciated that there is some overlap to the terminology and concepts pertaining to market transactions involving Type I contracts.

A "trader" is any person authorized to buy or sell, or to make offers to buy or sell, coupons in the market.

A "Promoter" is a special trader who has the power to issue its own coupons for sale. Like any other trader, promoters may also trade coupon in the market by meeting bid/ask prices in the market.

"Sale of a coupon by the Promoter"—When the promoter authorizes a new series of coupons for trading, it initializes the market by offering to sell to traders, at a stated offering price, coupons of that series. The promoter is not obligated to sell all its coupons at once, or to offer them for the same price. For instance, the promoter may sell the first 500 coupons at one price; wait a few days; offer to sell an additional 1000 coupons at a different price (which may reflect demand for the first 500 coupons); wait a week; offer to sell additional coupons, etc. Promoters may also offer to buy back coupons at stated prices from the market. Of course, market participants are not required to accept the promoter's offer.

"Active redemption of coupons by the promoter"—In certain cases, promoters may design the coupon so that it always has a right, but not an obligation, to buy back all coupons at a pre-stated price. Promoters may do this, for instance, if it anticipates a possibility that it may want to cancel an event. Then, to cancel the event, the promoters would simply buy back all the coupons, which relieves them of the obligation to settle the coupons at expiry.

"Limit order for purchase of a coupon"—The only orders traders may place to buy or sell individual coupons are limit orders. A limit order to purchase a contract A is an outstanding offer to buy at a certain price for a certain period of time. The offer must specify:
  numbers of A coupons desired
  maximum price per A coupon the aspiring buyer is offering
  an expiration date after which the offer terminates.

Acceptance of an outstanding limit order is binding on the offeror. The order is automatically withdrawn at 12.01 a.m. of the expiration date. However, traders may cancel their limit order at any time prior to their stated expiration date by placing a cancellation order.

"Limit order for sale of a coupon"—A limit order to sell a coupon is an outstanding order specifying:
  quantity of coupons offered for sale
  minimum price per coupon demanded
  an expiration date after which the offer terminates.

Acceptance of an outstanding limit order is binding on the offeror. However, traders may cancel their limit order at any time prior to their stated expiration date by placing a cancellation order.

Components of Coupon Markets

At any given instant before expiry, any coupon market will preferably consist of the following:

- a promoter who may (at its own discretion) sell additional coupons to or buy back coupons from the market
- a collection of traders' accounts qualified to transact in this market; that is, a collection of accounts qualified to place limit and buy orders on this coupon
- a queue of limit orders to buy coupons, preferably arranged in priority according to the following criteria in order of importance:
  - price per coupon (highest order first)
  - number of coupons offered (greatest quantity first)
  - time order was entered (earliest order first)
- a queue of limit orders to sell coupons, preferably arranged in priority according to the following criteria in order of importance:
  - price per coupon (lowest price first)
  - number of coupons offered (greatest quantity first)
  - time order was entered (earliest order first), and
- a mechanism for communicating to all traders' accounts timely information about the status of the market, including the price and volume information of recent trades, and the best limit prices and quantities in the limit buy and sell queues C. Type III ("Firm-Issue" and "Intra-Industry") Contracts Firm-Issue and Intra-Industry Contracts are custom-tailored contracts designed in consultation with industry and firm partners. They are designed to enable one or more firms within one or more specific industries to manage and/or share risks. For instance, a manufacturer may manage its inventory risks by issuing tradable coupons to its distributors as a means of pre-selling wholesale inventory to its retail distributors. Similarly, a loose confederation of firms may use intra-industry contracts to diversity their receivables portfolios, and reduce the seasonality of their cash flows. Firm-issue and Intra-industry contracts may be written on events or prices of noncommodity or inventory manufactured items. Tailored to the needs of the firms, they may be American or European, settle on cash, goods, or services and—depending on specific needs—may have exotic path-dependent payoff rules.

Since the clientele for firm-issue and intra-industry contracts is restricted and sophisticated, embodiments of the invention will usually include working with clients to specifically tailor and design contracts that meet individual needs. Firm-Issue and Intra-Industry contracts may also be referred to hereinafter as "restricted clientele" contracts.

Companies carry many risks such as those inherent in receivables, cash flow, supply chain and inventory management. A Market Authority acting in accordance with the present invention can help firms hedge these risks by designing firm-specific hedging contracts for these firms.

Relative to Type III contracts, a Market Authority would act as a firm's investment banker, and help the firm design, market, and sell (IPO) its hedging instruments into the thus created market or set up an internal firm-Specific or intra-industry futures markets for (1) supply chain management or (2) risk-sharing management. A business acting in accordance with the present invention could charge firms an up-front consulting fee and set up for these services, plus an on-going "market management" fee. The market-management fee could be per-transaction or a flat fee.

Supply Chain Management

To determine how much to manufacture or buy for inventory, manufacturers and retailers like to solicit "advance purchase orders." These prepaid contracts are redeemed for delivery of a product or service at a later date. However, such contracts are unattractive to customers since they force early customers to forecast future needs and assume the risk associated with early precommitment. But without precommitment from its customers, manufacturers and retailers face costly returns of unsold inventory.

One form of Firm-Specific and Intra-Industry Contracts are advance purchase orders on any product, cash amount, or service with an established quality that are tradable between a pre-qualified group of traders. The ability to trade them dramatically enhances the value of advance purchase orders to both the issuers and customers. The underlying products may include raw materials, intermediate goods, as well as wholesale consumer items. Wholesale consumer items may include new books, wine, electronic goods, office supplies, as well as semi-commodity items such as semiconductor chips, copper wire, photocopy paper, solar energy, and cable TV time. Finn-specific and Intra-Industry Contracts settle with the physical delivery of the underlying goods or services.

The thing that distinguishes Finn-Specific and Intra-Industry Contracts from Type II coupons is that the trading and holding of Firm-Specific and Intra-Industry Contracts are restricted to a pre-qualified set of traders.

Components of Firm-Specific and Intra-Industry Contract Markets

A Firm-Specific and Intra-Industry Contract is a tradable instrument that pays off at expiry a prespecified inventory item. The inventory item may be a commodity, a semi-commodity, or a specific product of manufacture. For example, the payoff may be a batch of 500 semiconductor chips, a ton of a given grade of high grade aluminum, a gallon of a specific grade of gasoline, a dozen Nike shoes of a given size and design, one dozen copies of the next year's Microsoft Windows operating system, or 100,000 banner ad displays on Yahoo!

"Expiry" refers to the period or time when the Firm-Specific and Intra-Industry Contracts may be redeemed for the payoff object. As specified on a contract-by-contract basis, the redemption date or period may be set or vary depending on the choice of the contract holder. Unlike Type I "event" contracts, the payoff of Firm-Specific and Intra-Industry Contracts may be fixed, or they may be chosen by the holder from a menu of possibilities pre-specified by the issuer. Moreover, the settlement date for a Firm-Specific and Intra-Industry Contracts contract may be at the contract holder's choice.

A "qualified trader" is any person authorized to buy or sell, or to make offers to buy or sell for a specific Firm-Specific and Intra-Industry Contract. A trader must specifically and separately qualify to trade in each Firm-Specific and Intra-Industry Contract. The qualifications for trading in a particular contract is determined by the Market Authority.

A "promoter" is a specially qualified trader who has the power to issue its own Firm-Specific and Intra-Industry Contracts for sale. Like any other qualified trader, promoters may also trade Firm-Specific and Intra-Industry Contracts in the market by meeting bid/ask prices in the market.

Sale of a Firm-Specific and Intra-Industry Contracts by the Promoter

When the promoter authorizes a new series of Firm-Specific and Intra-Industry Contracts for trading, it initializes the market by offering to sell to qualified traders, at a stated offering price, Firm-Specific and Intra-Industry Contracts of that series. The promoter is not obligated to sell all its Firm-Specific and Intra-Industry Contracts at once, or to offer them for the same price. For instance, the promoter may sell the first 500 Firm-Specific and Intra-Industry Contracts at one price; wait a few days; offer to sell an additional 1000 Firm-Specific and Intra-Industry Contracts at a different price (which may reflect demand for the first 500 Firm-Specific and Intra-Industry Contracts); wait a week; offer to sell additional Firm-Specific and Intra-Industry Contracts, etc. Promoters may also offer to buy back Firm-Specific and Intra-Industry Contracts at stated prices from the market. Of course, market participants are not required to accept the promoter's offer.

Active Redemption of Firm-Specific and Intra-Industry Contracts by the Promoter

In certain cases, a promoter may design the Firm-Specific and Intra-Industry Contracts so that it always has a right—but not an obligation—to buy back all Firm-Specific and Intra-Industry Contracts at a pre-stated price. A promoter may do this, for instance, if it anticipates a possibility that it may want to cancel a product. Then, to cancel the product, the promoters would simply buy back all the Firm-Specific and Intra-Industry Contracts, which relieves them of the obligation to settle the Firm-Specific and Intra-Industry Contracts at expiry.

Limit orders for Type III contracts work just like limit orders for Types I and II, which have been described above.

At any given time before expiry, any Firm-Specific and Intra-Industry Contracts market will consist of the following:
- a promoter who may (at its own discretion) sell additional Firm-Specific and Intra-Industry Contracts to or buy back Firm-Specific and Intra-Industry Contracts from the market
- a collection of qualified traders' accounts qualified to transact in this market; that is, a collection of accounts qualified to place limit and buy orders on this Firm-Specific and Intra-Industry Contracts
- a queue of limit orders to buy Firm-Specific and Intra-Industry Contracts, arranged in priority according to the following criteria in order of importance:
  price per Firm-Specific and Intra-Industry Contracts (highest order first)
  number of Firm-Specific and Intra-Industry Contracts offer (greatest quantity first)
  time order was entered (earliest order first)
- a queue of limit orders to sell Firm-Specific and Intra-Industry Contracts, arranged in priority according to the following criteria in order of importance:
  price per Firm-Specific and Intra-Industry Contracts (lowest price first)
  number of Firm-Specific and Intra-Industry Contracts offer (greatest quantity first)
  time order was entered (earliest order first)
- a mechanism for communicating to all qualified traders' accounts timely information about the status of the market, including the price and volume information of recent trades, and the best limit prices and quantities in the limit buy and sell queues.

Example 1

Inventory Futures for Supply Chain Management

Nike faces a persistent "supply chain" problem for its designer shoes. If a shoe store in Germany orders 1000 pairs of a particular design, it takes Nike several months to buy the raw materials, manufacture that lot (usually in an Asian factory), and transport it cost effectively (usually by cargo ship) to Germany. The problem is compounded because (i) Nike has outlets all over the world; (ii) the popularity of different designs vary greatly around the world; (iii) fads change in geographically-idiosyncratic ways in different geographical markets. For instance, a German store might believe in March that red Michael Jordan designs will become popular next Christmas and order 1000 pairs. However, in September it turns out that white shoes are the rage in Germany, and the German store can no longer sell the red shoes. However, suppose a red shoe fad takes hold in Brazil, and a Canadian outlet is willing to cancel its order of 500 pairs of white shoes—for the right price.

What is the most efficient way to reorganize this contractual arrangement so that the German outlet gets the white shoes, the Brazilian outlet the red shoes, and the Canadian outlet the right size?

Like other businesses, Nike has tried to solve its supply chain problem using Electronic Data Interchange (EDI). EDI is a form of business-to-business (B2B) intranet. However, EDI cannot efficiently solve the German-Brazilian-Canadian problem above. While the EDI model enables outlet stores to shorten the waiting time between their orders and receiving their goods, the wait time is still over one month. This is why there are frequent shortages of popular shoe brands, and overstocking of other brands. For the rush Christmas season, Macy's needs to place orders in September or October. And once orders are locked in, Macy's cannot cancel or change its order without causing somebody to suffer transactions costs. Even worse, Macy's looses customers, reputation, and profits whenever it cannot supply the hottest designs in a timely manner.

A Market Authority acting in accordance with the present invention can enable Nike to solve its supply chain management problem by setting up an internal futures market where Nike's wholesale customers (the individual stores of Macy's, Walmart, LLBean, Sears, etc.) can trade advance Firm-Specific and Intra-Industry Contracts between themselves. Instead of arranging individual supply contracts with Nike, every outlet goes to the futures market and buys the contracts it anticipates it needs. The outlets which are willing to pay the most for a particular design will buy it in the market (that is, the German outlet will offer higher prices for the white shoes contracts because of local demand, and when the price is high enough, the Canadian outlet will sell them—even if there is a moderate amount of local Canadian demand). At the same time, the German firm can sell its red shoes contracts to the Brazilian firm at the market price. The futures prices are determined by market forces and are fully liquid.

Moreover, prices of the various contracts inform Nike of market conditions in real time. So, if Nike sees that the price of a particular contract is increasing, it learns there is unmet demand for that type of shoes. Based on this real-time information, Nike can choose to increase supply and issue more contracts—but only if it is feasible and profitable for it to do so taking into account the market price and its cost of production.

Note: Nike gets paid for the shoes immediately upon sales of its futures contract into the market, and the contracts are only redeemable for shoes, not cash.

Example 2

Mutual Fund Cash Flow Management

Open end mutual funds have problems with cash flow. In such funds, investors have the right to buy or redeem more shares at will. Therefore, depending on market sentiment, these funds face either mass redemptions (and thus a cash shortage) or mass purchases (and thus cash surpluses due to excess inflows of investor cash). These wide swings in cash force mutual funds to alter their investment behavior. When they have a cash shortage, they are forced to sell shares. When there is a cash surplus, funds are pressured to make additional investments. However, these forced sales and purchases may be suboptimal. For instance, when the market crashes, investors tend to redeem their shares, which forces mutual funds with long positions to sell equity at lower prices that they otherwise would want to.

There are widely publicized indices which measure net cash inflow (NCI) or redemptions each month. Based on these indices, a Market Authority acting in accordance with the present invention could create bundles of contracts like the following:

A contract A which pays $10 if NCI is positive and $0 otherwise;

A contract B which pays $10 if NCI remains steady and $0 otherwise;

A contract C which pays $10 if NCI becomes negative and $0 otherwise.

Note that while the structure of this particular contract is like the Type I contracts, and A, B, and C together form a riskless bundle, not all Firm-Specific and Intra-Industry Contracts will be of this form. Thus, mutual funds that go long can smooth their NCI by buying contract C and Mutual funds that go short can smooth their NCI by buying A.

Banks, which are required by law (FDIC) to maintain a certain level of liquid cash on hand to enable depositors to withdraw their money, can use analogous contracts to insure a steady cash flow.

Example 3

Risk-Sharing Management

Firms A, B, and C are insurance companies that are liable for $1.0 billion of housing reconstruction in event of an earthquake in Los Angeles and firms X, Y, and Z are housing construction companies in Los Angeles.

Firms A, B, and C are risk complements to X, Y, and Z in the following sense. While an earthquake is financially devastating for A, B, and C, they create windfall profits for X, Y, and Z. A, B, and C and X, Y, and Z could reduce their financial volatility by pooling their risks so that, regardless of whether an earthquake occurs or not, each are guaranteed a median outcome.

These six firms can hedge each other's risk by forming a private market to trade the following two contracts:

Contract I which pays $10 if there is a 7.0 or greater earthquake in Los Angeles during year 2002, and $0 otherwise.

Contract II which pays $10 if there is not a 7.0 or greater earthquake in Los Angeles during year 2002, and $0 otherwise.

While these six firms may use a generic (publicly traded) earthquake contract to hedge, there are many reasons why A, B, C and X, Y, Z may prefer to trade between themselves in a private, industry-limited market. For instance, because the sums of payoff money involved are very large ($1.0 Billion), they may not want to use the pay-up-front bundles model. Instead, they may want to contract just between themselves, without prepayment, in which case credit risk and the identity of the qualified traders is important. Also, for competitive reasons, they may not want the price of the contracts to be publicly disclosed. So a Market Authority acting in accordance with the present invention can help them to create custom-tailored "club-only" futures markets for their own industry consortium.

Other examples of risk-complement industries include:

public transportation verses auto manufacturers airlines and oil companies telephone modem manufacturers, DSL providers, and cable modem service providers ice cream manufacturers and hot chocolate manufacturers network computer manufacturers and traditional computer manufacturers genetic therapy firms and traditional drug manufacturers brick and mortar retailers verse Internet retailers banks and brokerage houses alternative energy suppliers verses traditional utilities.

Example 4

Egghead-Onsale Cash Flow Futures

Egghead-Onsale is worried that if things do not go well in the next quarter, it may have cash flow liquidity problems. It is too late to be doing a new SPO (in any case, management would prefer not to dilute the shares), and the interest rate that banks are demanding for debt is unattractive.

If there is no hedging and things go well (50% chance), Egghead-Onsale will have $11 million dollars of cash at the end of the quarter. If things do not go well (50% chance), Egghead-Onsale will be $1 million dollars in the red.

Egghead-Onsale would prefer to lock-in a riskless cash balance of $5 million. To do this, a Market Authority acting in accordance with the present invention can help Egghead-Onsale by constructing the following contracts:

Contract I which pays $10 if Egghead-Onsale has more than $10 million dollars cash as reported on its audited financial statements for year-end 2002, and $0 otherwise.

Contract II which pays $10 if Egghead-Onsale has between $0 and $10 million dollars cash as reported on its audited financial statements for year-end 2002, and $10 otherwise.

Contract III which pays $10 if Egghead-Onsale has less than $0 cash as reported on its audited financial statements for year-end 2002, and $0 otherwise.

In the simplest design, a Market Authority acting in accordance with the present invention will issue these contracts into the market. Egghead-Onsale will establish long positions on both Contracts II and III according to the hedging recipe (Eq. 1) given above for Type I contracts.

Other examples include rent payment futures for office complexes and futures on property resale prices.

Example 5

Receivables Futures Example

Suppose that Sun Microsystems ("Sun") sells hardware to Internet startups on a long term credit basis, and that it now has $1.0 billion of receivables on its books. Sun expects that about 10-20% of those receivables will not be collectible since some of its customers will declare bankruptcy. Sun would be willing to sell its $1 billion of risky receivables for $850 million cash. By designing and trading futures contracts that pay off depending on how much of the $1.0 billion is collected, a Market Authority acting in accordance with the present invention can help Sun sell its portfolio for $850 million cash.

Economic Benefits of Tradable Firm-Specific and Intra-Industry Contracts

Using the example above of Nike shoes, Nike benefits from numerous ways from the futures markets:

Nike can "test" the popularity of each shoe design by first putting up, for instance, 5000 futures contracts for sale in January for "IPO" price of $25. Suppose the original IPO batch trades at a market price of $38 in February. Then Nike can gradually offer additional contracts for sale at the new market price ($38).

At the same time, Nike can monitor which geographic location is buying which type of contract and, therefore, gain insight into the fads for that year and use this information to focus its advertising campaign and production schedule.

Nike has the discretion ultimately to sell all or just a fraction of each shoe via the futures market.

At its discretion, Nike has an American option to repurchase its own contracts from the futures market if it decides delivery of the shoes is not in its own best interest.

This "self-organizing" market mechanism reduces Nike's sales staff and administrative overhead.

The retail outlets also benefit. Outlets, in turn, are more willing to buy Christmas futures early in the year since they can always resell if that particular design is not popular in their region.

Also, if a fad breaks out in Brazil for red Nike shoes, the Brazilian outlet will be willing to pay more for the red shoes futures; as a result, both the German seller and the Brazilian buyer benefits. In other words, the outlets share in the more efficient allocation of the shoes through trading the futures.

One of ordinary skill in the relevant art will appreciate that analogous contracts can be created for any other inventory semi-commodity product in any industry.

While several types of contracts have been described, and examples of each given, the present invention is not limited to methods and apparatus for trading only these types of instruments. Instead, the present invention is directed to a method and apparatus that can create a risk hedging marketplace and is not limited by the types of risk instruments which can be traded there.

II. The Contract Trading System

As noted in the summary of the invention, an objective of the present invention is to enable and provide a new form of risk hedging. The first section of this specification addressed the various hedging contracts or instruments, the sale and transactions which are a necessary adjunct to the inventive process and apparatus. Having defined and described some of the types of risk hedging instruments which can be sold and traded to hedge risk, the discussion will now address preferred embodiments of the method and apparatus according to the present invention.

A preferred embodiment of the present invention will be described next in reference to the various figures. A preferred embodiment of the present invention is configured as an Internet-based web server, which provides a world-wide-web (WWW) accessible user interface and software to implement the unique functions of the present invention.

FIG. 1 shows a general internet-based webserver which implements the present invention. Main Computer 100 is connected either directly, or indirectly via a local-area network (LAN) or wide-area network (WAN), to the Internet 200. Main Computer 100 is programmed with webserver software 400 so as to be able to (i) serve data out in response to received Internet user requests; (ii) accept account login and other account management and trade instructions from Internet users; (iii) communicate users' instructions to the trade engine and computers associated with the trade engine; and (iv) serve data and respond to instructions from the Market Authority 500. The Web Server Software 400, Market Authority 500, Account Management Engine 600, Trade Engine 300, Market Database 390, Account Database 610 and Clearance and Settlement 690 will be discussed later. Note, while the Market Authority 500, Trade Engine 300, Account Management Engine 600 and other functions are shown in FIG. 1 as being directly attached to Main Computer 100, each of these functions can also be connected to the Main Computer 100 indirectly via a LAN, WAN, Internet or other computer connection. Moreover, each function may be provided by one computer or distributed over multiple computers, and any given computer may provide one or more functions.

In FIG. 1, the market database 390 is designed to collect and organize exchange data. This data will not include any private information such as member identification, but will consist primarily of executed trade prices and volumes. The majority of this information will be available to members and reported to government regulatory authorities in accordance with applicable regulations. Further, the government regulatory authority may require access to all of this information should it deem such access necessary for surveillance or other purposes. Information will be available on all orders placed on the system in order to provide members with histories and data points as to the state of various contract markets.

The Account Database 610 contains data on individual members and their accounts, which allow the Account Management Engine 600 to function. By way of example, and not limitation, the Account Database 610 preferably consists of at least the following items of information:

information identifying each member, including his or her name, account number, web login name, login password, any other account-related IDs or secret passwords;

member contact information (e.g., mail, Email, telephone number);

status of the account (e.g., active, suspended, deactivated);

history of the account, including activation date(s), suspension history, dates and amounts of all money transfers, dates and amounts of all market transactions, dates and description of all bids and offers entered, dates and amounts of all transactions with the settlement bank, dates and amounts of all interaction with the Market Authority 500, dates and balances at each date, and any remarks about the account entered by the Market Authority 500.

Figure 2:
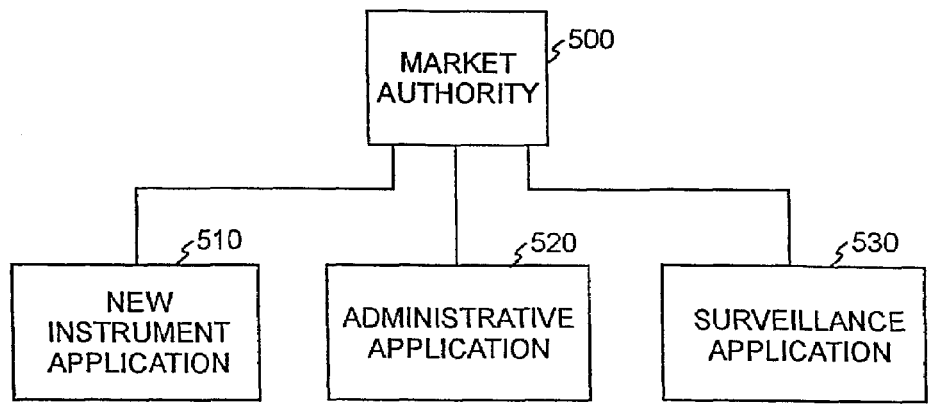
FIG. 2 shows an expanded view of the Market Authority 500.

FIG. 2 shows an expanded view of the Market Authority 500. The Market Authority 500 contains a New Instrument Application 510. The New Instrument Application 510 is used to introduce new and different hedging instruments to the exchange (i.e., new types of contracts to be traded). It will enable authorized personnel to, among other things, inform members of new instruments, post messages regarding the terms and conditions of new instruments, and list new instruments on the market.

Specifically, the New Instrument Application 510 will provide the capability for both Members 10 and the Market Authority 500 to design and list new instruments as well as modify existing instruments. During operation of a market according to the present invention, preferably the Market Authority and its members will be continually developing new instruments for the exchange. The New Instrument Application 510 allows users to quickly define critical components of a contract, thus enabling the rapid rollout of millions of potential instruments. The New Instrument Application 510 provides an easy to use interface through which the terms of a contract are identified, described, and defined and which are then sent to the appropriate market administrative personnel for approval. Upon approval, the new instrument is preferably immediately listed in the portal, trading, and clearing systems, however, the system can also provide for a delayed listing of new instruments. For example, and not by way of limitation, the New Instrument Application 510 may require the following information for a new instrument:

Tracking Information: e.g., Contract Id Number Etc.
Ownership Information
Underlying Event or Item
Unit of Original Issuance
Contract Bundle Issuance & Redemption Price
Contract Payout Criteria
Unit of Trading: e.g., 1 Contract
Contract Price Quotation
Min. Price Increment: e.g., $0.01
Max. Contract Duration: e.g., 1 Yr
First Trading Day
Last Trading Day
Trading Hours: e.g., 24×7×365
Expiration Date: e.g., 2 Days After Last Trading Date
Settlement Date: e.g., 2 Days After Expiration Date
Expiration Value
Settlement Value
Settlement Method The market authority 500 contains two additional applications: an Administrative Application 520 and a Surveillance Application 530. The Administrative Application 520 will allow administrative personnel to:

undertake limited inquiry into all market transactions;
suspend and resume trading in particular contracts or the market as a whole;
suspend and resume or terminate account privileges based on the rules of the exchange;
suspend contract payouts in the event of an emergency or some other eventuality detailed in market rules;
amend and override calculated settlement prices and redistribute funds in the event of an unforeseen system error or an event identified in the rules of the exchange; and
distribute announcements to all or selected market participants.

The Surveillance Application 530 will provide compliance staff with view-only access to all current and historic transaction data input into the exchange by members, from order placement to message posting on the electronic bulletin boards. The system will be programmable to draw attention to specific events of interest to the compliance staff. The system allows the staff to investigate specific transactions and trade patterns and will permit the staff to view member identification information along with order information. More specifically, the Surveillance Application 530 will allow the staff to:

view the complete depth of the market for all contracts (i.e., the listing of all pending bid and offer orders);
view the details of all transactions including counter-party identities, which are hidden from market participants;
view all electronic bulletin board postings;
define and track a set of alerts that will highlight the occurrence of specific events and transaction patterns; and
investigate any alerts or activity that has potential to violate rules of the exchange.

Figure 3:
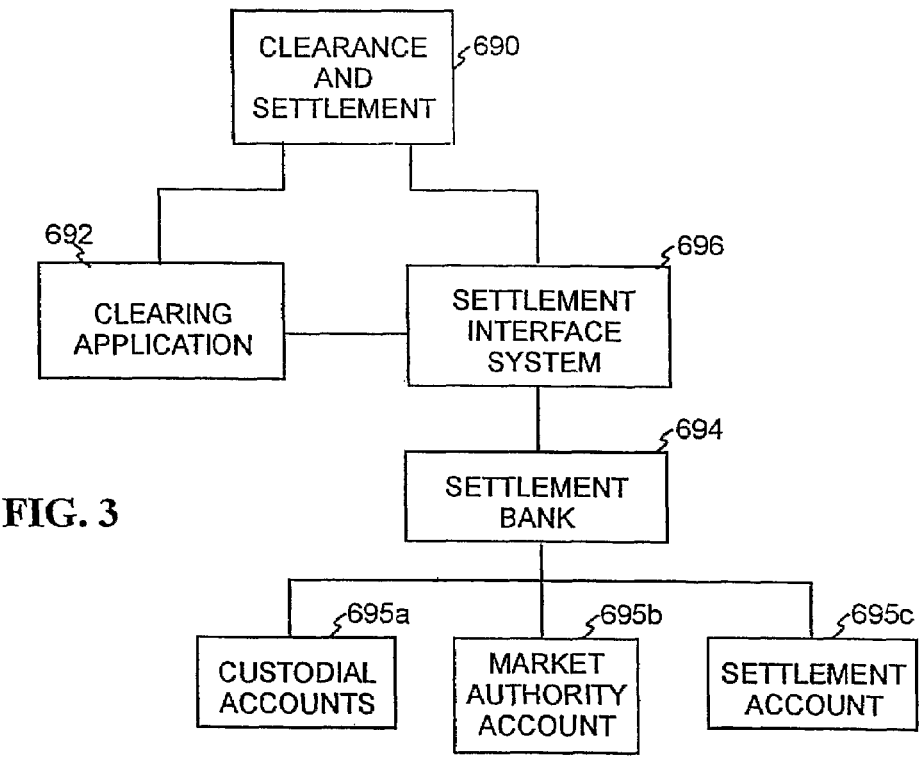
FIG. 3 shows an expanded view of the Clearance and Settlement 690 function.

FIG. 3 shows an expanded view of the Clearance and Settlement 690 function. The Clearance and Settlement 690 function includes the Clearance Application 692, Settlement Bank 694 and Settlement Interface 696.

As depicted in FIG. 3, one component of Clearance and Settlement 690 is the Clearing Application 692. As the sole clearing agent for the exchange, the Clearing Application 692 enables the Market Authority 500 to monitor all transactions and record all transaction data necessary for the clearing and settlement of every trade on the exchange. Clearing Application 692 gives the Market Authority 500 access to member specific transaction data including member account information as well as the details and status of all orders. Further, the Clearing Application 692 will communicate with the Settlement Bank 694 to provide instructions, review settlement account information for all members, and reconcile clearing information with settlement account information.

The second component of Clearance and Settlement 690 is the Settlement Interface System 696. The Settlement Interface System 696 will be the link through which the trading system communicates with the Settlement Bank 694 (See also FIG. 7). The Settlement Interface System 696 will work with the various components of the MOPS (See FIG. J) and the Clearing Application 692 to automatically provide instructions to the Settlement Bank 694 such as blocking funds needed to execute an outstanding trade, moving funds between accounts due to purchases and sales of contract bundles and contracts, and crediting funds to accounts when in-the-money contracts expire. Settlement Interface System 696 queues instructions in chronological order and either (i) sends the queue in batch mode to the Settlement Bank 694 for processing at intervals throughout the day, or (ii) maintains continuous, real-time settlement through an on-line bank. The settlement interface will also perform periodic tests to ensure that the clearing records maintained by the Account Management Engine 600 are consistent with the settlement account records maintained by the Settlement Bank 694. If there are any discrepancies, Account Management Engine 600 will take all necessary steps to accurately reconcile the two records. To ensure maximum efficiency and reliability, the Settlement Interface System 696 is designed in cooperation with the Settlement Bank 694.

As illustrated in FIG. 3 and as described below, the Market Authority 500 will preferably maintain three types of accounts with one or more settlement banks. The first type of account is a Custodial Account 695a, which the Market Authority 500 maintains for each of its members. These accounts are for the benefit of the individual members and all funds and instruments held in these accounts will be owned by the member. However, these accounts will respond only to the instructions of the market clearing system. The second type of account is a Market Authority Account 695b, which is a proprietary account that will hold all unencumbered funds owned by the Market Authority 500. This is the account into which trading fees, structuring fees and the like are deposited. The third type of account is a Settlement Account 695c which is essentially an escrow account. Proceeds from the sale of bundles are deposited into the settlement account and are held there until the expiration of the contracts which make up that bundle. Upon expiration, these funds are used to pay off in-the-money contracts.

Figure 4:
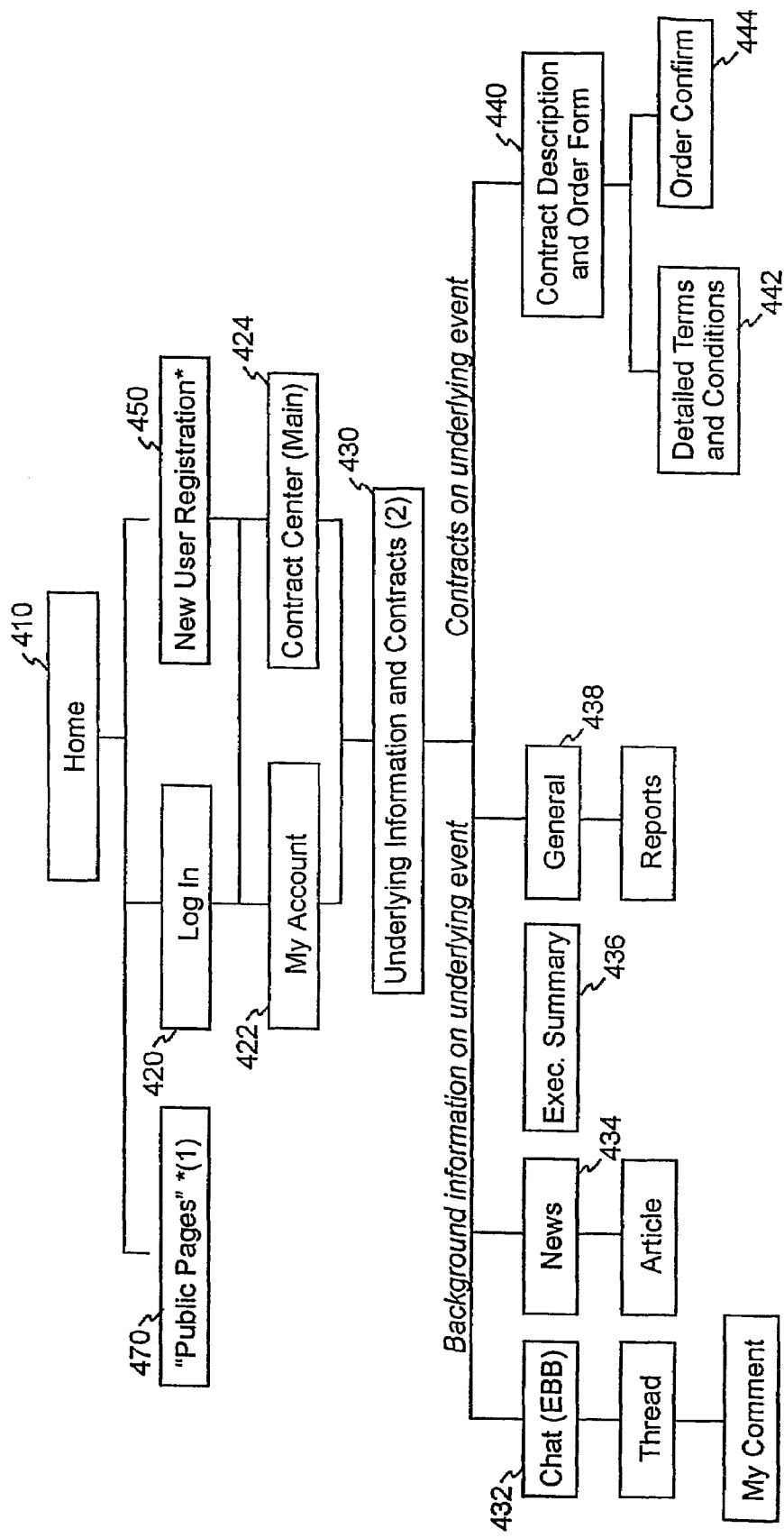
FIG. 4 shows a general top level web-site design in accordance with a preferred embodiment of the present invention.

FIG. 4 shows a general top level web-site design in accordance with a preferred embodiment of the present invention. FIG. 4 generally illustrates the main levels of the website and identifies some of the categories of pages which are provided in the preferred embodiment. The Home Page 410 is the front page to which new and some existing users will go as the starting point for interacting with the present system. Home Page 410 provides links down to pages at lower levels. At a level below Home Page 410 are: Log In Page 420, to which registered users go to log in (some registered users may prefer to use Log In Page 420 as their initial page); Public Pages 470 contain general introductory and administrative information about the site for users (see FIG. 6); New User Registration Page 450, which provides online registration forms and information for prospective registrants (see FIG. 5); My Account Page 422, which is the customizable home page for a registered user who has logged in; Contract Center Page 424, which provides a list—by event or subject matter—of contracts being traded and a pathway for users to access a catalogue of contracts via the Underlying Info and Contracts Page 430; and Underlying Info and Contracts Page 430, which provides an organized catalogue of contracts being traded, including links to updated market data pertaining to trading activity on each contract.

Each contract has a corresponding electronic bulletin board or Chat Page 432 to which users can post information and voice personal opinions; a News Page 434 which contains recent pertinent news feeds from commercial wire services; Executive Summary Page 436 and General Reports Page 438 which contain summary historical and background information on recent trading, price, and volume activity on the contract. Each contract also has a corresponding Contract Description and Order Form Page 440. From the Contract Description and Order Form Page 440 the user may access a Detail Terms and Conditions Page 442, and an Order Confirmation Page 444, should the user elect to execute an order using the order form.

The Executive Summary Page 436 for each contract bundle will display real time quotes for the best bid and offer for each contract in each outstanding series of the contract bundle. The Executive Summary Page 436 will also show the expiration date for each outstanding series, the payout criterion for each contract, and the current rate, level, or value of the underlying. The Executive Summary Page 436 will also allow the member to hyperlink to the rules describing the contract bundle and contracts, charts showing the trading history of all the contracts, and a glossary of terms related to the contract bundles, contracts, and the underlying.

Figure 5:
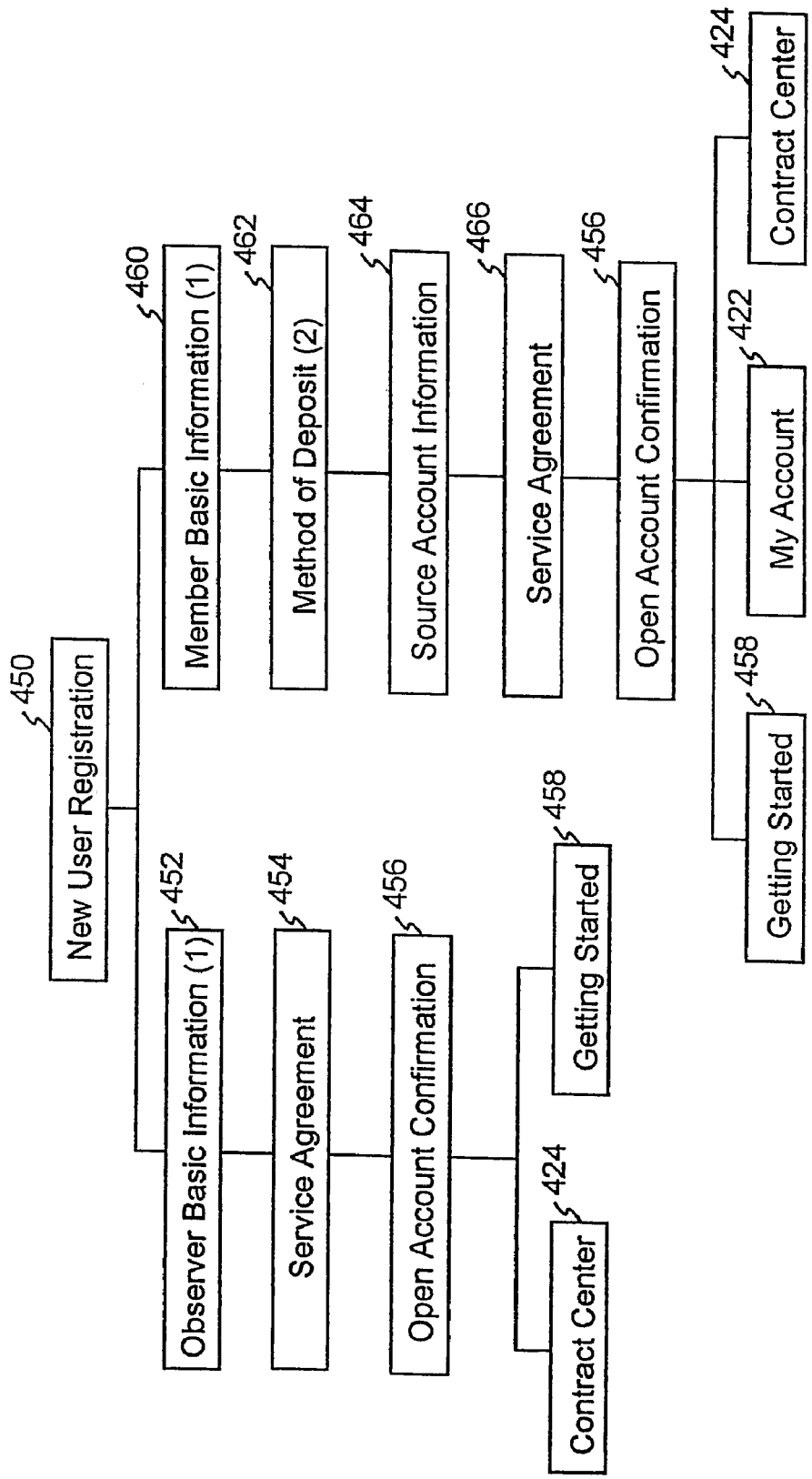
FIG. 5 shows an expanded view of the pages which are located below the New User Registration Page 450.

FIG. 5 shows an expanded view of the pages which are located below the New User Registration Page 450. Specifically, below the New User Registration Page 450, are Observer Basic Info (1) Page 452 and Member Basic Info (1) Page 460. Beneath Observer Basic Info (1) Page 452 are the Service Agmt. Page 454 and the Open Acct. Confirmation Page 456. Beneath Open Acct Confirmation Page 456 are the Contract Center Page 424 and Getting Started Page 458.

Similarly, beneath the Member Basic Info (1) Page 460 are the Method of Deposit (2) Page 462, the Source Acct. Info Page 464, the Service Agmt. Page 466, and the Open Acct. Confirmation Page 456. Note that there are some pages, such as the Open Acct. Confirmation Page 456, which can be accessed by more than one page. Beneath the Open Acct Confirmation page 456 are the Getting Started Page 458, the My Account Page 422, and the Contract Center Page 424, all of which are accessible from other pages.

Figure 6:
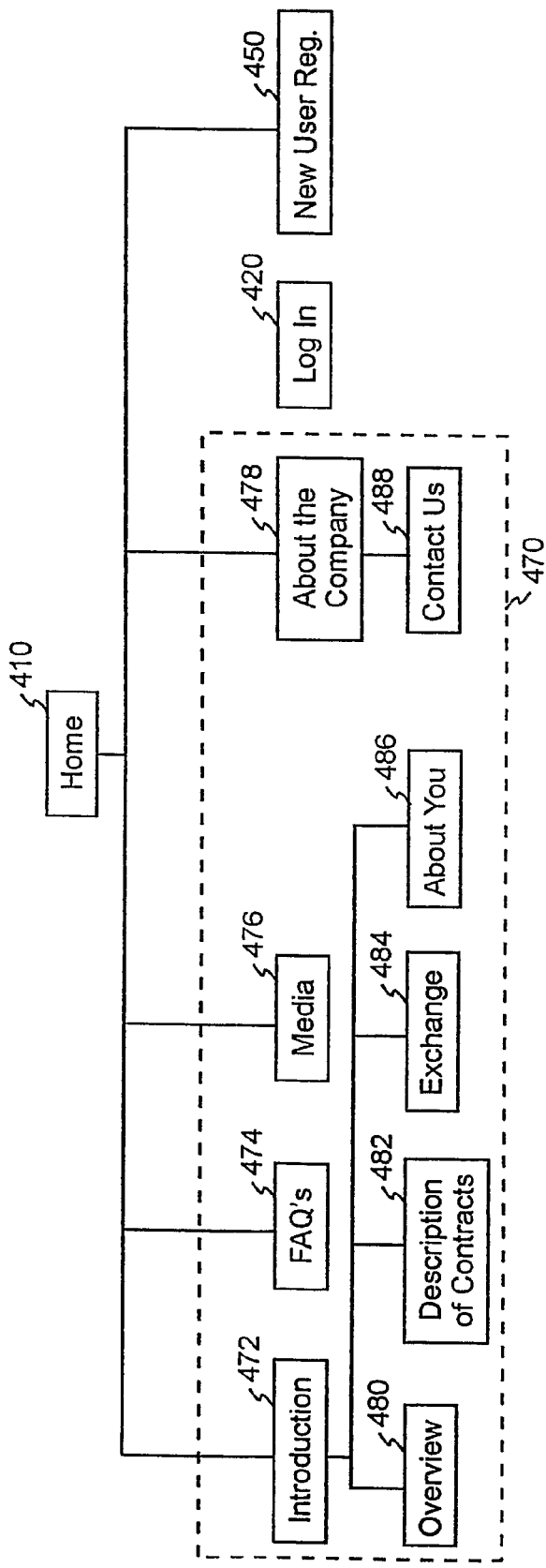
FIG. 6 shows an expanded view of some of the pages which belong to the Public Pages 470.

FIG. 6. shows an expanded view of some of the pages that belong to the Public Pages 470, which are located below the Home Page 410. Specifically, below the Home Page 410 are: the Introduction Page 472; the FAQ Page 474; the Media Page 476; and the About The Company Page 478. As noted in regard to FIG. 5, other pages which are located below the Home Page 410 are the Log In Page 420 and a New Users Registration Page 450. Below the Introduction Page 472 are: the Overview Page 480; the Description of Contracts Page 482; the Exchange Page 484; and the Page About You 486. Below the About The Company Page 478 is the Contact Us Page 488, which provides information about how retail users can contact the company.

Figure 7:
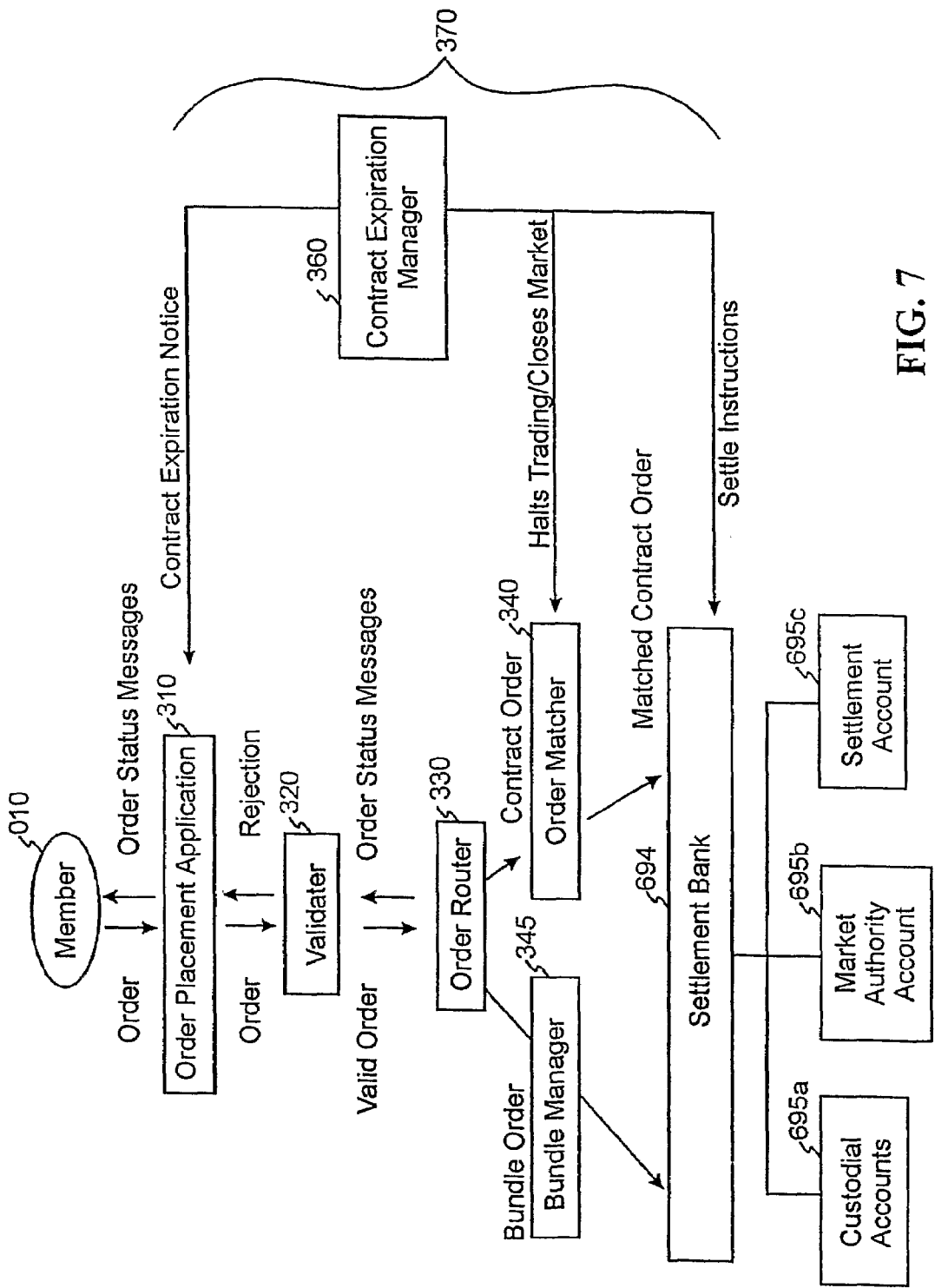
FIG. 7 shows a flow chart of a member interacting with the Trade Engine 300 function of FIG. 1.

FIG. 7 shows a flow chart of a member interacting with the Trade Engine 300 function of FIG. 1. Specifically, as shown in FIG. 7, a Member 10 accesses the Trade Engine 300 via a computer connection such as the Internet and the Web Server Software 400. When the Member 10 places an order via the Order Placement Application 310, the order is verified by the Validater 320. If the order is accepted, it is routed to the Order Router 330.

As depicted, the Order Placement Application 310, the Validater 320, the Order Router 330, the Order Matcher 340, the Settlement Bank 694, and the Contract Expiration Manager 360 comprises an integrated system, the "Order Management and Processing System 370 (OMPS)." The OMPS 370 is the engine supporting the front end application and provides all the automated functions necessary for the execution of valid orders and the settlement and payout of all contracts. The OMPS 370 accepts orders from the interface system and returns status information as the order is processed throughout the system. This processing system consists of the following functions: validating orders, routing valid orders to the appropriate order matching engine, prioritizing orders, and matching orders as appropriate. Every action taken on an order will be recorded to provide a clear audit trail of system activity and to ensure accurate clearing of all transactions. At different points in the processing, the OMPS 370 will communicate with the settlement bank or the clearing application, providing settlement instructions and periodically reconciling settlement bank records with OMPS records. In the preferred embodiment, the OMPS 370 is maintained on a UNIX platform and all logged records will be time stamped accurately to the millisecond (the maximum precision currently available within UNIX).

The Order Placement Application 310 is used by members to place and track orders for contracts and bundles. The trading system will only accept limit orders (orders which require price and quantity to be specified). The Order Placement Application 310 will allow members to perform the following activities:

place a new order to purchase or sell a contract;
place a new order to purchase or redeem a bundle;
cancel or change a pending order which has not either expired or been executed;
track the status of an order;
view real-time the best bid and offer; and
view last trade price, trading volume, and trading history.

If it is an order to purchase or sell a bundle, the order is sent to the Bundle Manager Application 345, which is responsible for bundle sale, redemption and expiration management. The Market Authority 500 stands ready to sell and redeem bundles at a fixed price of $10. Such transactions will be executed by a fully automated system that will be overseen by the market authority. The Bundle Manager Application 345 will execute and allow the Market Authority 500 to monitor these types of transactions.

Upon immediate acceptance by the Market Authority 500, an order to purchase or redeem a bundle is routed to the Settlement Bank 694 for settlement and clearance. On the other hand, if the order is a limit order to buy or sell a contract, then it is routed to Order Matcher 340, which places the order into a queue. The priority that the order assumes in the queue depends on the market trading rules, which takes into account factors such as the time of order placement, price, and number of contracts. When the Order Matcher 340 matches the order with a suitable counteroffer, and the order is first in the queue for orders of its type, then the order is routed to the Settlement Bank 694 for settlement and clearance. As described previously, several accounts are maintained at the Settlement Bank 694, including Custodial Accounts 695*a*, which the market authority maintains for each of its members, the Market Authority Account 695*b*, which is a proprietary account that holds all unencumbered funds owned by the Market Authority 500, and the Settlement Account 695*c*, which is an escrow account that holds proceeds from the sale of bundles until the expiration of the contracts which make up that bundle and from which funds are taken to pay off in-the-money contracts.

At a time determined by contractually prespecified rules, contracts expire. When a contract expires, either it is worth $10 or $0 depending on the realization of the outcome of the underlying event. The Contract Expiration Manager 360 expires contracts and determines the final liquidation value. Upon expiry, the Contract Expiration Manager 360 notifies all holders of the contract. It halts trading by freezing the Order Matcher 340 for that particular contract. If the contract expires worthless, the Contract Expiration Manager 360 removes the expired contract from traders accounts. If the contract expires worth $10, the Contract Expiration Manager 360 notifies the Settlement Bank 694 to credit the account of the holder of each contract which is worth $10.

Before an order is processed by the OMPS 370, it must first be designated a legitimate order. The validation subsystem of the Validater 320 will determine whether an order is legitimate by:

(i) making sure the member has permission to trade. Any member wishing to place an order must log in to the system by providing a valid ID and password combination. The validation subsystem will check the privileges of the account from which the order originates to ensure that the account holder is (1) allowed to purchase the contract identified in the order and (2) that the account holder is not already logged in to the system;

(ii) reviewing the order information to make sure it is complete and identifying existing contracts or bundles that may be traded; and (iii) optionally checking order originating account information to ensure that the account has the necessary cash and/or contracts to fulfill the order. If it does, then the system blocks the appropriate assets so that the member cannot use these assets for a second order or other activities. As described below, this test may be delayed until Order Matcher 340 has determined a possible match.

If any of these tests are not satisfied, the validation subsystem of the Validater 320 will send a message to the Member 10 rejecting the order and providing a brief explanation as to why the order was rejected. If all three tests are satisfied, then the order is validated, the status of the order is updated to reflect validation, and the order is transmitted to the order routing subsystem. Simultaneously, the Member 10 receives an order confirmation notice.

The Order Router 330 acts as a switch, directing orders received from the Validater 320, the Order Matcher 340 or other specific subsystems. If the order is for a contract (as opposed to a contract bundle), then the Order Router 330 directs the order to the order matching subsystem for that particular contract. If the order is for purchase or redemption of a bundle, then no order matching is necessary because this is a direct transaction with a fixed price of $10. Consequently, the Order Router 330 will send instructions to the Settlement Bank 694 or to the Clearance and Settlement Application 690 to transfer funds appropriately, and will simultaneously update the Market Authority 500 and the member's accounts for the change in values of their portfolios. The Order Router 330 will also maintain and keep current a full audit history for each order passed on by the Validater 320. It will provide (1) a status history recording every change in the state of an order thus providing a complete system audit trail and (2) an execution history recording all executions made against an order. User accounts will be updated for all changes in the status of an order and histories will be accessible for audit purposes.

There is an order matching subsystem within the Order Matcher 340 for each contract traded on the Exchange. The order matching subsystem will maintain a complete list of all bid and offer orders on a particular contract (the order book). The orders in these order books will be prioritized first by price and second by the time the order was placed. All orders will be anonymous and the order matching subsystem will match orders based only on price, quantity, order expiration time/date, and time the order was placed. Each order matching subsystem will process a new order received from the order routing subsystem according to the following standard price-time priority algorithm:

If the price of the new order is not better than or equal to the best contra order listed in the order book, then the new order will be added to the order book in a unique position reflecting its price and time priority information;

If the price of the new order is better than or equal to the best contra order listed in the order book, then the new order will be matched against that contra order at the price of that resting contra order;

If this does not fill the quantity of the new order, then the subsystem will match the remainder of the new order with lower priority contra orders in the order book until the quantity of the new order has been satisfied or there are no orders remaining on the contra side at a price equal to or better than the price of the new order; and Any remaining quantity after all possible executions have been generated will be placed into the order book in the position reflecting its price and time order placed priority.

Each order matching subsystem will process one order at a time to preserve order prioritization. One of ordinary skill in the art will appreciate that the above-described price-time priority algorithm, while preferred, is but one possible set of priority features and priorities and is provided by way of example and not by way of limitation.

As described above, in one embodiment of a system according to the principles of the present invention, each limit orders are validated by Validater 320 to ensure that the originator of the order has sufficient funds or contracts to satisfy the order. If the assets are available, they are frozen until a transaction is completed or the order expires. This has the disadvantage of limiting the flexibility of a trader. For example, a trader may desire to acquire $10,000 worth of either of two Type I contract bundles A and B, with no preference for one bundle over the other, except that she wants to execute whichever bundle first meets the terms of her order. Under the above-described embodiment of the invention, when the purchaser submits an order for $10,000 worth of contract bundles A, validator 320 freezes $10,000 worth of funds in her account. However, unless she has an additional $10,000 on account, validator 320 will not validate an order for $10,000 worth of contract bundle B. Thus, the purchaser must select in advance one of the two contract bundles to purchase. If the purchaser later decides to instead purchase the other bundle, the first order must be cancelled and a new order submitted. This causes the order to be requeued and the purchaser loses her position in the price-time priority queue.

Alternatively, in a preferred embodiment of the present invention, validation of an order is delayed until Order Matcher 340 identifies a potential matching contra order. In this embodiment, when a potential match is identified validator 320 ensures that the originators of each order has sufficient assets in their respective account to complete the transaction. If the originators have sufficient assets, the transaction is completed as described above. If, however, an order originator fails to have adequate assets their order is cancelled and the match is not completed. A valid but unmatched order is returned to it respective buy/sell queue in the same position it had prior to the attempted match. In a preferred embodiment of the present invention, order originators whose orders are rejected because of insufficient assets when a match is attempted are charged a small fee. Such a fee may improve matching and settlement efficiency because it provides an incentive for traders to ensure they can satisfy their orders.

However, the delayed validation provides users with more flexibility. For example, the purchaser desiring to acquire $10,000 worth of either of contract bundles A or B may submit a limit order to purchase $10,000 worth of contract bundle A and another limit order to purchase $10,000 worth of contract bundle B—even if they have less than $20,000 on account. When one of the limit orders is satisfied, the originator may cancel the other limit order. Thus, the purchaser is able to acquire whichever of the contract bundles first satisfied their respective limit order.

Once an order is matched, it cannot be amended or canceled. However, if it is still in the order book, the order matching subsystem will accept cancellation and amendment instructions from the interface system. If the order is amended, the order matching subsystem will treat it as a new order, and the new order will have a time priority corresponding to when it was amended.

An order will be removed from the order matching subsystem if:
- the order is matched with a contra order;
- a the order is matched with a contra order, but it cannot be validated;
- the order is canceled by either the member who originated the order or administrative staff in accordance with the rules of the exchange;
- the contract specified in the order expires before the order is matched; or
- the order expires by its terms before it is matched.

The member will be notified of any of these events, and all order histories will be updated to reflect the occurrence of any of these events.

Working with the order management subsystem, the Contract Expiration Manager 360 will record the change of ownership of all contracts traded on the exchange. Upon expiration of a set of contracts, the Contract Expiration Manager 360 will accept instruction from the Market Authority 500 as to which contracts are in-the-money, notify all owners of the expiring contracts of the expiration, and credit member accounts in the amount of the value of the contract upon expiration (which is either $0 or $10). Simultaneously, the Contract Expiration Manager 360 sends instructions to the Settlement Bank 694, identifying the accounts of members holding contracts which expired in-the-money and directing the Settlement Bank 694 to transfer funds to those accounts.

The above description of an apparatus according to present invention illustrates and describes a computer-based system in terms of functional block diagrams and website page structures. One of skill in the art will appreciate that once the desired functionality of the computer system is defined (as has been outlined above), and/or the basic contents of the web pages have been identified (as has been outlined above), the acts of programming one or more computers or computer systems to perform these functions is considered to be within the ordinary skill in the art for computer programmers. Moreover, while the above description of an apparatus according to present invention illustrates and describes a computer-based system based on certain functional block diagrams and website page structures where specific functionality is partitioned in discrete portions, one of ordinary skill in the art will appreciate that the computer code may be partitioned and/or combined in different discrete portions without changing the overall functionality of the system or departing from the spirit of the invention.

III. How Potential Registrants and Members Use the System

Thus far we have described some of the types of risk hedging contracts which can be traded and have also described a preferred embodiment of an overall system for offering, trading, redeeming and settling these contracts. Next, the method of the present invention in accordance with the operation and function of a preferred embodiment of the invention will be described with reference to the figures. In the following, certain functions and processes of the system will be described, but the present invention is not limited to this set of functions and processes and some of the functions can be omitted or modified and other functions and/or processes added without departing from the spirit of the invention.

Registration Function

As noted above "Member" refers to a client who is registered with the market. In addition to having trading and account privileges, members will be able to view the market, post and read messages using electronic message boards, and read news reports relating to the market, the contract bundles and contracts, or the underlying measures.

In addition to its members, the Market Authority 500 will allow the general public to access specific areas of the web site which are designated to be public and read descriptions of the exchange, review organization and rules, read the descriptions of contract bundles and contracts, view the daily bid and offer prices and trading volume figures for the various contracts, and, if they so elect, fill out member applications. Non-members are prohibited from participating in the market. Thus, non-members will not be allowed to purchase or sell instruments or add messages to electronic bulletin board(s).

In the computer-based implementation of the present invention, to become a Member 10, an applicant must access the Main Computer 100 through the Internet 200. As depicted in FIGS. B and C, the applicant can access the New User Registration Page 450 from the Home Page 410. From there, the applicant must follow the directions, read the information, print and fill out the necessary forms, and mail in the forms with his signature and an initial deposit.

An applicant is required to certify in writing that he is (1) a citizen or permanent resident of the United States and (2) old enough to enter into a legally enforceable contract. If the applicant is an organization, it must reside in the United States and be validly organized, in good standing, and authorized by its charter to trade futures contracts. Before being designated as a member, an applicant will be required to read, and certify that they have read, the risk disclosure document. Member applicants must also agree to be bound by the site rules and to certify that they will only trade for themselves or the company for whom they are registering and will not trade as an intermediary for others. Finally, in order to become a member, an applicant will be required to open an account at the clearing agent. The minimum initial deposit to open an account is a standard amount, for instance $500.

After the Market Authority 500 approves an application for membership, the Market Authority 500 will: (1) assign the member an account number; (2) require the member to select a password; and (3) require the member to select an identification code ("ID") for use in conjunction with electronic bulletin board and messaging system. In order to access the exchange, a member need only log onto the Internet 200, go via the Internet 200 to the website Home Page 410, and enter his or her account number and password. Members will be prohibited from maintaining more than one account. To police the one-account-per-member rule, the market authority will routinely scan its account database for identical names, telephone numbers, social security numbers, and other identifying characteristics.

The contract rules allow the market authority to suspend or terminate, wholly or in-part, the privileges of members who violate the rules of the exchange in any way, including by supplying false information in an application for an account. Other grounds for suspension or termination of member privileges will include trading for someone other than themselves or the company for whom they are registered to trade on the market, behaving in a manner that affects the integrity of the market or its underlying systems, or any other reason necessary to protect the market, its members, or the public.

Logon Process

In order to log into the system, a member or registrant must access the Main Computer 100 via the Internet 200. The member or registrant must provide a valid account number and initial password combination not already logged onto the system. Members will be required to police their account number, ID, and password to ensure that no one has improperly accessed their account. The Main Computer 100 system will record all log ins and attempted log ins. If five consecutive failed log in attempts are recorded for a particular account (due to incorrect password), then the appropriate software module working in cooperation with the Web Server Software 400 will automatically suspend that account. The Web Server Software 400 will then send an e-mail to the address registered to that account informing the user of the account suspension and asking the user to log into a uniquely generated reactivate account link. Upon successful log in, the user will be required to select a new password for the account and may change other aspects of his/her user profile (e.g., e-mail address).

Logout Process

For a user to close access to his account and the system, the user must actively log out. To minimize the possibility of unauthorized access, the appropriate software working in cooperation with the Web Server Software 400 can also log out a user if the system loses contact with the user's computer or if the user is not active on the system (and does not respond to a system request) for more than an predetermined time, for instance 10 minutes. In this case, the user's session is automatically "timed out".

Account Set Up Process

After completing, signing, and mailing in the registration application together with some cash amount that is at least the required minimum initial deposit of $500, the applicant must wait for formal approval of his application.

Once the Market Authority 500 approves a new user application, the member is notified by mail and Email, and the member is authorized to log in to his account for the first time. Thereupon, the member is authorized to access his account on the Main Computer 100 via the Internet 200. In the Log In Page 420 the member types in his user ID and initial password. If the member successfully logs in, he will be required to change his initial password by typing in (twice for confirmation) a new password. The new password will be active each time he logs in thereafter until he changes it.

When a new member logs in to his account for the first time, he will be asked to set up a personal home page. To this end, the member is offered a menu of items he can choose to include in his personal home page, and is asked to answer questions about the layout of those items on his personal page. Some of these items to be included are mandatory. The mandatory items include cash balance, the market value of the members contracts held in the account, and the per contract prices of each of the types of contracts in the member's portfolio. Other items are discretionary. Discretionary menu items include a list of links to updated information about contracts the member may be interested in, news headlines (general and specifically tailored), market indices, alert items concerning the market, links to bulletin boards, and other links of interest.

Existing members may change the items and layout of their personal pages at any time by clicking on a "change homepage" link.

Adding and Removing Funds from an Account

The first time a new member logs in, his account will have only his initial deposit, which is some amount at least $500. From time to time, members will want to either add or remove funds from their account.

Funds in member accounts as well as funds credited to the account of the Market Authority 500 in payment for contracts will be credited to an account at a bank (i.e., the Settlement Bank 694). Members will be permitted to fund their trading accounts by electronic check, wire transfer, or other means. Funds will not be available for trading purposes in a member's account until the member's deposit has cleared.

A member may withdraw funds from the credit balance in his trading account by making an appropriate request. On the same or the next business day following receipt of an appropriate request, the clearing agent will direct the Settlement Bank 694 to transmit the funds by check or other means to the member. The funds will be withdrawn from the account of the Market Authority 500 within three business days of the request, and will be electronically transmitted to a destination account specified by the member. In the event that a member attempts to withdraw funds exceeding the available cash balance in his account (i.e., the cash in the account that is not blocked or otherwise set aside to cover a pending purchase order), the request will be rejected and the member will be informed of the reason the request was rejected. To the extent that the request is rejected because funds in the account are blocked, the member will be so informed and may unblock the funds by canceling the pending order for which the funds have been blocked.

View Market Data Process

The Executive Summary Page 436 summarizes the current activity on each actively traded contract. The Executive Summary Page 436 may be accessed in many ways. As depicted in FIG. 4, the user has several alternate ways of accessing the Executive Summary Page 436 for each given contract. First, the user may simply go via the Internet 200 to the Home Page 410. From the Home Page 410, the user can go to the Underlying Info and Contracts Page 430, select the contract link he is interested in, and click on that to get an Executive Summary Page 436 of the market activity on that contract. Without logging in, however, the user cannot place a trade in this contract.

Alternatively, the user can proceed from the Home Page 410 to the Log In Page 420. After logging in, he will see his Personal Home Page 422 (i.e., My Account Page 422). From his Personal Home Page 422 (i.e., My Account Page 422), the user will either be able to directly access the Executive Summary Page 436 (if he has chosen to include the link for this contract on his Personal Home Page 422 (i.e., My Account Page 422)), or he can access the Underlying Info and Contracts Page 430, from which he can access the Executive Summary Page 436 pertaining to a particular contract.

Order Placement and Execution

The site will be open for trading 24 hours a day, seven days a week. This continuous trading cycle avoids the need to develop rules for ordering and executing member orders placed while the market is closed. The continuous trading cycle also avoids the need to develop rules for setting opening prices and eliminates, by definition, the possibility of a gap between closing and opening prices sometimes experienced on traditional markets.

To access the market, the member will access the Internet 200, proceed to the website Home Page 410, enter his or her account number and password, and hyperlink to the trading page for the contract bundle and contracts he or she wants to trade. Additionally, on the My Account Page 422 the member will have access to his or her current account balance and current open positions, and the page will provide the member with a variety of text, pull-down, and check boxes that the member can use to purchase or redeem a contract bundle or to enter an order to buy or sell a contract.

To ensure equality of access to market information, all members will be able to view the size and price of the same number of recently executed trades and the same number of outstanding bids and offers. At a minimum, all members will be able to view records of all trades executed within the last hour as well as a real time updated listing of the size and price of the best outstanding bid and offer. Although all members will have access to this market information when they enter an order, this information may, of course, change between the time the member submits an order and the time the market receives and processes it.

To place an order, the member proceeds to the Contract Description and Order Form Page 440 (shown in FIG. 4). The only type of orders that the trading system will accept will be limit orders, which are orders to buy or sell a specified number of contracts at a specified price or better. The member will be able to choose from the following different types of limit orders:

Time Specified: A limit order with an expiration date designated by the member, not to exceed a fixed time, for instance sixty days, from the date the order is placed.

Immediate Or Cancel: A limit order that is to be executed in whole or in part within a short time, for instance five minutes, of being placed on the market, and any portion of the order not executed within that time limit is cancelled.

All Or Nothing: A limit order that is to be executed only in whole, and not in part, within the time period designated by the member, not to exceed a predetermined time, for instance sixty days, from the time the order is placed.

Cancel If Bettered: A limit order that is automatically cancelled if the price bid or offered is not the best price for the contract in the orders resting on the market.

In accordance with one embodiment of the invention, when a member places an order to either buy a contract trading in the market or to buy a new contract bundle, the Order Placement Application 310 (FIG. 7) automatically confirms that the member has sufficient funds in his or her account to execute the trade prior to adding the order to the order book. If the member has insufficient funds, the Order Placement Application 310 will inform the member of the shortfall and ask the member if he or she wants to execute the amount of the order that can be satisfied with existing funds. In accordance with the member's answer, the Order Placement Application 310 will either adjust the size of the order or cancel it. To ensure that a member cannot place an order that he or she does not have sufficient funds to cover, it is presently anticipated that the Order Placement Application 310 will permit only limit orders and not market orders. Additionally, funds from the member's account that would be needed to fill unexecuted limit orders will be "blocked" when the order is accepted so that they are excluded from the funds the system uses to determine if the member has the funds necessary to place another buy order. If a member seeks to withdraw blocked funds from an account, the member will first be required to cancel pending orders sufficient to remove the block.

Alternatively, in accordance with another embodiment of the invention, confirmation that the member has sufficient funds to execute the trade is delayed until a potentially matching contra order is found. If sufficient funds are on hand the transaction is consummated. Otherwise the order having insufficient funds is cancelled and the other order is returned to the applicable buy/sell queue. Preferably, the originator of the cancelled order is charged an appropriate fee.

Once the order is accepted, the member will be required to confirm it, and the order will then be placed in the order book. After an order is placed in the order book, it will remain outstanding until the earliest of its execution, its cancellation by the member (or by in limited circumstances such as the termination of a series), the expiration of the time limit placed on the order by the member, for instance sixty days, or the expiration of that contract series. A member may cancel an order at any time prior to execution of the order by entering a cancellation order, and if the order has not been executed before the Order Placement Application 310 can withdraw it, the member will be notified that the order has been canceled.

All orders will be anonymous, and orders will be prioritized for execution according to predetermined criteria. For instance, orders will be prioritized for execution first by price and then by time, meaning that the best bid or offer will have priority over all other bids or offers, and bids or offers entered at the same price will be executed in the order they were received by the system. If orders with the same price are received at exactly the same time (if such an occurrence is technologically possible) one will be randomly assigned time priority over the other using the minimum incremental unit of time in the system.

A newly entered bid that is higher than the best outstanding offer or a newly entered offer that is lower than the best outstanding bid will be executed at the price represented by the preexisting bid or offer to the extent that the size of the resting bid or offer is adequate to fill the new order. If the order is only partially filled by the resting contra order, then the remainder of the order will remain in the Order Book at its limit price and will execute against subsequently listed contra orders at its limit price.

After the Order Placement Application 310 confirms that the member has the finds necessary to buy a contract bundle or contract and executes the buy order, the Order Placement Application 310 will, in the case of a contract bundle purchase, open positions in one of each of the contract bundle's contracts in the member's account and instruct the Settlement Bank 694 to debit $10 per contract bundle purchased from the member's account and to credit that money to the settlement funds account. In the case of a contract purchase, the Order Placement Application 310 will open the contract position in the purchasing member's account and close the position in the selling member's account and will instruct the Settlement Bank 694 to debit the cost of the purchase from the member's account and credit the value of the purchase to the selling member's account. Trading fees will also be debited from the member's account and credited to an account at the Settlement Bank 694.

When an order is executed, the member will be sent confirmation by electronic mail. Upon execution of an order, the system will adjust the open positions in the members' accounts and inform the settlement agent, which will make the necessary account adjustments. If for some reason a member wishes to dispute an order that he or she entered and confirmed, the member will be required to provide the confirmation number issued with the order and any subsequent confirmation numbers (such as a cancellation confirmation number) associated with the order.

Two Ways to Establish the Same Position

A member can establish the same position in each contract in two ways. For instance, suppose the member wants to own one A contract. One way to do this is to place a limit order to buy one A contract. Then, when that order is settled, his desired position is realized.

But there is an alternative route the member can use to establish the same position. He can (1) purchase a bundle that contains the A contract; (2) put limit orders to sell every contract in that bundle EXCEPT the A contract. Then, upon execution of all his limit sell orders, the member will own exactly one A contract.

Trading Fees

The presently preferred embodiment contemplates that interest will be paid to members based on the free cash balance in their accounts. However, the presently preferred embodiment does not presently anticipate paying interest on either funds paid to the Market Authority for the purchase of contract bundles, or on blocked cash balances (i.e., balances blocked by the system because they would be needed to execute orders resting on the market). Income from investment of these funds, as described in more detail below, will accrue to the benefit of the Market Authority. Thus, the foregone investment return on these funds represents a cost to members of dealing in the exchange. The presently preferred embodiment also contemplates charging transaction fees for transactions in contract bundles and contracts. The fee per trade will be at least a minimum fee set by the market authority based on the cost to market authority of processing a trade. The fee may be higher than the minimum fee based on the number of contract bundles purchased or redeemed or the number of contracts traded. Other fees, such as fees for orders cancelled because of insufficient funds, may also be assessed to users of the system of the present invention.

Cancellation and Modification of Orders

Once an order is executed, it may not be cancelled or modified. However, members will be able to cancel or modify an order at any time before it is executed. All pending orders which a member has outstanding will be listed on the member's account page. To cancel or modify a pending order, the member will select the order to be changed and using prompts, either (1) cancel the order, (2) amend the order, or (3) leave the order unchanged. If the member chooses to cancel the order and if the order has not been executed before the system can withdraw it, the member will be notified that market authority has canceled the order. If the member chooses to modify the pending order, the member will be shown the details of the existing order and be allowed to change any order variables (with the exception of the underlying event to which the contract pertains). The member will also be informed that a modified order will be treated by the order book as a new order, causing the order to lose its original time priority.

Record Keeping and Retention

The Order Placement Application 310 will automatically record all orders placed on the market, and all trades executed, by date, time, quantity, contract bundle or contract type, underlying, price, expiration month, payout criterion, and member account number. In conjunction with the Market Database 390, the Order Placement Application 310 will record all settlements by time, amount, and member account number. The system will also record by time all changes in the best bid or offer for a contract.

As noted above, the Market Database 390 is an electronic database from which internal (nonpublic) market data, market data to be shown members, and publicly disseminated market data may be electronically retrieved and disseminated interactively. The internal market data preferably includes, but is not limited to, records of all orders, executions, cancellations, and other transactions entered into the Trade Engine 300, trading volume, changes in bids and offers for all contracts, and reports generated by the Market Authority 500. The market data to be shown members includes, but is not limited to, a list of (preferably about 5) recently executed orders, the best current and offer on the market, and periodic trading volume updates. The publicly disseminated market data, disseminated to vendors of market data and reported to government authorities, consists of a list of recent trades, trade volumes, and the best bid and offers.

The system will transfer this information, and all other statistical information gathered from its market, to a searchable database (i.e., the Market Database 390) for retention for a predetermined period, for instance a time of not less than five years. Using its database, the system will be able to reconstruct rapidly and accurately transactions executed on the trading system and provide that information to the CFTC upon request. As part of its record retention program, market authority will also maintain for five years full records of all activity undertaken pursuant to its affirmative action program to secure compliance with the relevant provisions of Sections 5, 5a(a), 5b, 6(b), 6b, 8a(7), 8a(9) and 8c of the CEA.

Trade Process—Split

A member does not have to do anything during a contract split. The member's account is automatically updated and the split contract is replaced with the new set of post-split contracts. The original pre-split contract is no longer actively traded, so all existing limit orders on that contract are cancelled. The member is automatically authorized to trade on the post-split contracts if he desires.

Trade Process—Combined Contracts

A member does not have to do anything during a contract combination. If the member does not do anything, any entire set of contracts he owns designated for recombination will be automatically combined. If he owns some, but not all, of the contracts designated for recombination, those unmatched contracts will not be recombined and he is permitted to continue trading in those individual contracts as if there were no recombination. At expiry, those contracts will be settled as if there were no recombination.

Redemption Process Details

As will be explained in the following, there are two kinds of redemption: the redemption of bundles, and the redemption of contracts at expiry.

Complete bundles may be redeemed at any time. The Market Authority 500 stands ready to purchase for $10 complete bundles at any time from any member. To redeem a bundle, all the member does is submit the order on the Contract Description and Order Page 440 (Illustrated on FIG. 4). Such redemption orders are executed instantly.

If the member places an order to redeem a contract bundle or to sell an existing contract in the member's account, the Order Placement Application 310 will automatically confirm that the member has the number of contracts he or she wishes to redeem or sell and, if so, redeem the contract bundle or place the order on the market. If the member does not have the appropriate number of contracts, the trading system will inform the member of the shortfall and ask the member whether he or she would like to redeem or sell all or a portion of the contracts the member does have, or cancel the order. Based on the member's answer, the system will redeem or enter a sell order representing the correct number of contracts designated by the member, or cancel the order. A pending sell order will block the number of contracts subject to the order so that the same contracts cannot be subject to more than one pending sell order.

At expiry, contracts are settled automatically. By definition, every contract is worth either $10 or $0 at expiry. If a contract is worth $10 at expiry, the Contract Expiration Manager 360 (which is illustrated in FIG. 7) removes the contract and replaces it with $10 cash balance in the member's account. If the contract is worth $0 at expiry, the Contract Expiration Manager 360 simply removes the contract from the member's account.

IV. News, Bulletin Boards, Other Services

Another one of the innovations of the present system and method according to the present invention is that such a system provides a one-stop information and "discount" brokerage service. As such, it can aggregate all relevant news, information, instruction, educational, and discount brokerage services on its website to stimulate the interest of and communication between traders.

V. Hedge Market Account Card

A Hedge Market Account Card ("HMAC") is an optional but preferred component in a risk hedging market and system according to the present invention. The HMAC works like a bank debit card. A HMAC carries information identifying the holder's trading account number and, together with a password that must be entered separately, allows the cardholder to access his account from portable machines. While the HMAC is described as a "card" for the sake of illustration, in fact it can be a radio frequency tag, or any other type of indicator of identity including merely an account number to be entered on a keypad, or otherwise.

One use of the HMAC is to redeem tickets at box office. If the holder shows up at the concert with his card, swipes the card through a card reader (also referred to hereinafter as a "point of sale terminal") and enters a password, the reader (which can be connected to the Internet or to a computer directly connected to a suitable database) allows the cardholder to redeem the appropriate futures contracts in his account for concert tickets on the spot. The Market Authority electronically deducts the contracts from the holder's account, and issues tickets for the concert.

One can imagine other related uses for the HMAC. For example, card holders who don't have tickets could just show up at the box office with their card. They can use their card to log in to their hedging account and bid for tickets that are still trading in the appropriate futures market.

Another scenario is a "delivery on demand". For instance, a futures coupon for "a Spagos dinner in November" could have an "American" style expiration. The holder can get his meal any time during November by presenting his HMAC at Spagos. Spagos would have a card reader to enable settlement of the appropriate futures coupon.

"Member" refers to a client who is registered with the market. In addition to trading and account privileges, members will be able to view the market, post and read messages using electronic message boards, and read news reports relating to the market, the contract bundles and contracts, or the underlying measures. Members will also have a HMAC.

While the HMAC has uses for all types of trading, the HMAC is particularly useful for trading Type II (coupon) contracts, as described above.

The procedure for becoming a member is the same as that described above in the Section pertaining to Type I contracts and the Market Authority mails members who desire to trade coupons, a HMAC.

Regarding the adding and removing of funds from an account, in addition to the procedure described above for Type I contracts, members may be allowed to purchase a limited number of coupons using their credit card.

Regarding the view market data process, in addition to the procedure described above for Type I contracts, the Market Authority and its partners may provide special terminals for interfacing with the market at the venues where coupons are redeemed.

In addition to the procedure described above for Type I contracts, the Market Authority and its partners may provide special terminals for interfacing with the market at the venues where coupons are redeemed.

Ticket Redemption

Many implementations of the HMAC are possible. Two examples are given below.

In a first exemplary method, each box office has Internet-connected HMAC readers. HMAC holders may use these readers to redeem their futures coupons for tickets in "real" time. However, HMAC holders may also do much more via the card readers, including giving orders to place last minute trades to buy additional coupons or to sell their unused coupons.

Every venue which uses the hedge market's services is equipped with then HMAC card readers at its box office. The card readers are hooked up to the hedge market's computers via a fast Internet connection, and they also have the ability to dispense tickets on demand (like how bank teller machines can issue cash). Coupon holders use these readers to redeem their tickets when they come to the concert (ball game, play, etc).

A card holder swipes his HMAC on the card reader and enters his secret PIN. The card holder is prompted to enters the number, N, of tickets he would like to redeem. If the card holder has at least N of the corresponding coupons in his account, the Market Authority automatically settles N of the coupons, and immediately issues N tickets to the card holder.

If the cardholder has less than N redeemable coupons in his account, he is prompted to buy more coupons to make up the difference. Suppose the cardholder needs M additional coupons. Then he is told the best ask prices in the market for M coupons, and is asked if he would like to place a limit order to meet those asking prices.

If he says "yes" and there are sufficient funds in his account to make the purchase, the M coupons are purchased, his final total of N coupons are redeemed, and N tickets are immediately issued. If he says "yes" but his account lacks sufficient funds to purchase M coupons, he is given the option to purchase fewer than M, or to insert a credit card, from which funds may be debited to cover the difference. In either case, the HMAC cardholder determines how many tickets he wants to redeem, pays one way or the other, the necessary coupons are purchased and redeemed, and the tickets are issued on the spot.

Any HMAC holder may, even if he starts with zero coupons in his account, purchase the necessary coupons and, therefore, buy N tickets—assuming that there are enough tickets offered for sale in the limit sell queue. Towards the starting time of very high demand events like the Super Bowl, it could very well be that the limit sell queue is empty. If the limit sell queue is empty, or it does not contain any asking prices the HMAC holder is willing to meet, the HMAC holder is prompted to enter limit buy order(s), and to check back in a few minutes to see if his order(s) is(are) met.

If, on the other hand the HMAC card holder's account has extra coupons remaining in his account after redeeming his N tickets, he is prompted and asked to indicate if he wants to sell the remaining coupons in the market. If it is near show time, the card holder will have no reason NOT to sell. If the card holder indicates he wants to sell, he is given information on recent transaction and offer prices, and asked to indicate his asking price(s), and then the appropriate sell orders are placed in the queue.

Coupons can continue trading as long as the tickets have any value. After the tickets lose value, the coupons themselves become worthless and the Market Authority will automatically terminate the market. This means the coupons market can continue trading even after the concert starts, because latecomers may still want to buy tickets. However, after the concert ends, there is no point to trading the coupons (unless the promoters have additional provisions for refunding unused tickets).

Alternative Redemption Method II

Method I demands a live Internet (or other speedy) connection to the central market databases. It may be that this connectivity is not always cost-effective. When that is the case, an alternative is to (a) pre-announce ahead of time that the Internet connected market stops trading H hours before the concert (or play, game, etc); (b) H hours before trading, freeze all Internet trading; and (c) the box office downloads (via the Internet or private secure connection) the records of all market information (including which account owns which position, and all the queue information) down to local computers.

With all the information downloaded into local computers, the theatre box office can now handle all trading and redemption with local computers without having to communicate with the Market Authority computers.

After downloading the market information, the theatre box office may handle redemptions in two alternative methods.

First, the box office may not support any additional coupon trading. In this case, it will simply allow HMAC card holders to redeem at the site whatever coupons the cardholder owns. Unredeemed coupons either expire worthless, or are refunded a pre-stated cash amount.

Alternatively, the box office computer may support a continuation of market trading with the local (non-Internet connected) computers. In this case, the original limit bid/ask queues are still active. However, to place or cancel queue orders, an account owner MUST show up at the box office with an HMAC card and use one of the local terminals.

HMAC card holders who show up at the box office may redeem their coupons, or place trades in accordance with Steps 1-8 described in Method #1 above. The only difference is the absence of an Internet connection to allow offsite members to place or change their limit orders.

Compared to Method #2, the advantage of Method #1 is that it allows last minute trading of coupons up to and during show time from anywhere in the world, which benefits "scalpers" and speculators. Its disadvantage is that it encourages scalping and speculation, and the cost (to the Market Authority) of Internet connectivity.

VI. Open Source

The present inventors are considering open sourcing the invention and design of new types of futures contracts to academics and industry-specific experts as part of the inventive market implementation and operation.

In one implementation, the Market Authority would employ a person responsible for managing the outsource developers. The outsource developers design the financial instruments (i.e., types of futures contracts) in their own time, and submit their products to the Market Authority. The Market Authority retains the rights of final approval and acceptance. Submitters of approved and accepted instruments are compensated by a fee and, possibly, a royalty arrangement on their instrument.

To stimulate the outsource development community, the Market Authority may sponsor and operate specialty conferences, mailing lists, task listings, Internet bulletin boards, and other forums where academics and other experts can discuss and debate their ideas. The Market Authority may also operate virtual chat rooms and appoint moderators to moderate the forums and ultimately oversee the finished system.

Product Design.

A working list of candidate contracts can be published on a web site by the Market Authority for contract developers. Comments and input can be solicited from the general public about candidate contracts on this list. The Market Authority can take into account public comments before selecting contracts from this list for trading. The Market Authority may develop a more granular design process along the lines of an N-step process that all products go through before they are marketed to the general public.

Benefits of Open Source

Open Source gives the Market Authority direct access to a wide intellectual talent pool. By collectively harnessing the intellectual resources of a wider pool of academics, Open Source will generate great ideas that a small group of employees couldn't possibly imagine, regardless of how smart they are.

The Market Authority can immediately get involvement from the corporate experts in the Industry. These corporate experts better understand their company's risk management needs than external experts.

Open Source provides the Market Authority with visibility and credibility, which from a marketing perspective is impressive. There is potential for a viral contagion effect to some degree, and it gives the Market Authority which exploits Open Source, the potential for an evangelical advantage (like Linux).

Open Source is likely less expensive than hiring internal experts.

Open Source leverages the power of the Internet.

Open Source lends cache, public identification and awareness, and momentum, and hence creates a greater barrier to entry for a market developer who does not use Open Source.

In summary, Open Source in our financial context is loosely analogous to the development of Linux in the software context. The U.S. has several thousand universities, and most of them have an economics and/or finance department. The relevant academics and their graduate students are relatively easy to identify and contact to be the first Open Source contributors.

VII. Variable Payout Hedging Contracts

In addition to the foregoing Type I, Type II and Type III contracts other types of risk hedging instruments may be defined, each of which introduces unique, novel and valuable methods which are considered part of the present invention. Moreover, in addition to the general purpose computer based system described in the foregoing, it will be apparent to ones of ordinary skill in the art that the novel aspects of the risk hedging approaches will imply specific and novel apparatus attributes in systems which are used to buy, sell, trade, and redeem these instruments. Accordingly, the following discussion addresses both novel methods of hedging risk and making or administering a market for the hedging of risk but also novel systems and apparatus for facilitating the same.

The underlying contracts consist of the following:

(i) Fixed Pay-Out Hedging instrument: An binary contract that is worth $0 if the value or range of values represented by the Hedging instrument has not occurred by or on the expiration date and a fixed amount, e.g., $10, if the value or range of values represented by the Hedging instrument has occurred by or on the expiration date.

(ii) Variable Pay-Out Hedging instrument: An contract that is worth either $0 if the value or range of values represented by the Hedging instrument has not occurred by or on the expiration date, or an in-the-money amount that is set based on the degree to which the value or range of values represented by the Hedging instrument has occurred by or on the expiration date. Optionally, the value of the instrument may be capped.

(iii) Hedging instrument Bundle: A group of fixed or variable pay-out hedging instruments, each of which represent a mutually exclusive range of values of the underlying measure and which collectively represent all, or just some, of the possible values of the underlying measure.

Variable Pay-Out Hedging Instruments

Variable Pay-Out Hedging instrument: A contract that provides the in-the-money contract holder with a payment up to a capped maximum amount, and requires the out-of-the-money contract holder to pay up to that same capped maximum amount, depending on the value or range of values of the underlying by or on the expiration date.

A Market Authority can offer a Variable Pay-Out Hedging instrument on any measure with any fixed number point range. For example, a Market Authority may offer a Variable Pay-Out Hedging instrument on the XYZ broad-based index futures with a 100 point range from 1950-2050. The buyer of the instrument (the "long") is entitled to receive, and the seller (the "short") is required to pay, $1 (or a multiple of $1) for every point the index gains above the index level at which the parties entered into the contract, and the buyer is obligated to pay, and the seller is entitled to receive, $1 (or a multiple of $1) for every point the index drops below the index level at which the parties entered into the contract.

Depending on the rules of the trading market, trading a variable pay-out instrument may require Blocked Funds, or other collateral, equal to the buyer's or seller's maximum potential loss per contract times the number of contracts traded plus any applicable trading, origination, clearing, and settlement fees and commissions.

For a buyer, the profit or loss is:

$$(Ending\ Price - Purchase\ Price) * (\#\ of\ contracts)$$

The maximum potential loss is simply the loss caused when the final value of the index is less than or equal to the lower bound of the trading range, i.e, (Purchase Price-Lower Bound). If, a trader in the example above wishes to purchase 10 contracts at 1985 the maximum potential loss is:

$$(1985-1950)*(10)=\$350.00,$$

The blocked funds are used to cover any loss including a loss up to the maximum possible loss. If, on the other hand, the markets rally and the upper bound is breached, the trader would realize a maximum profit of:

$$(2050-1985)*(10)=\$650.$$

and the $350 of Blocked Funds would also be returned to the trader.

At any point before the halt of trading the trader can liquidate the position by finding another exchange member to assume the trader's obligations in the open market. If, for instance, the long closes its position by selling that position on the open market at 2007, his profit would be:

$$(2007-1985)*(10)=\$220\ profits$$

and the $350 of Blocked Funds would also be returned to the trader.

The position of the seller is the mirror-image of the position of the buyer. Selling this instrument short requires a blockage of funds equal to the seller's maximum potential loss per contract times the number of contracts traded plus any applicable trading, origination, clearing, and settlement fees and commissions. Maximum potential loss is simply (Upper Bound-Selling Price). If, for instance, a trader wishes to short 10 contracts in the above example at 1985, the maximum potential loss is:

$$(2050-1985)*(10)=\$650.00$$

If, on the other hand, the XYZ Index trended down, the trader could realize a maximum profit of:

$$(1985-1950)*(10)=\$350.00\ profit$$

At any point before the halt of trading, the trader can liquidate the position by finding another exchange member to assume the trader's obligations in the open market. If, for instance, the short closes its position for a loss by buying back that position on the open market at 2007, his loss would be:

$$(1985-2007)*(10)=\$220$$

which would be covered by the blocked funds, and the remaining $430 of the blocked funds would be returned to the trader.

Futures contracts designed in this way would preserve an essential feature of the Hedging instrument in that a Market Authority would not need to manage risk—the market is always fully-funded or collateralized (i.e. no margin). That is, the Market Authority would be guaranteed to hold the maximum amount that it would be obligated to pay out to customers on the contracts.

To ensure that the market is always funded, trading in variable pay-out hedging instrument is halted if the index level goes outside the trading range set in the contract. For example, the trading of the XYZ index futures described above would be halted if the index moved outside of the range 1950 to 2050. In accordance with a first embodiment of a variable pay-out hedging instrument, trading is permanently halted when the upper or lower limit is first breached. In an alternative embodiment, trading is only halted so long as the underlying measure, e.g., the XYZ index, is outside of the specified range and trading may recommence if the underlying measure comes back into the allowed range prior to the expiration of the contracts.

It is anticipated that these variable pay-out contracts should be deemed to be futures on a broad-based index and therefore within the exclusive jurisdiction of the CFTC. The contract would behave economically like a standard exchange-traded future between the cap and the floor. Adding an upper and lower limit to the future would not make it any less a future. This analysis is bolstered by the fact that futures currently have limits in that exchanges impose daily price limits on some futures contracts, and every futures contract has a lower limit in that the price of the underlying commodity cannot go below zero.

A difference between the Variable Pay-Out Hedging instrument and a standard future is that the maximum loss is paid in by the buyer and seller up front and the contract thereafter is not subject to daily "variation" or "market to market" payments. However, the amount paid in is not a "premium" that is paid by one side and earned by the other as in the case of an option. In the case of an option that is written at the money, if the value of the underlying measure has not moved at expiration, the option will expire worthless and the writer will keep the premium. On the other hand, if the variable pay-out contract described above is filled at the current market value of the underlying measure and the market does not move, neither side will experience any gain or loss. It thus behaves like a future rather than an option. The fact that the maximum loss is paid in up front is a purely mechanical matter of how the risk is managed rather than any fundamental difference that should affect jurisdiction.

Example 1

Variable Pay-Out Contract for a Broad-Based Index Future

Suppose a buyer and seller enter into a contract based on the XYZ stock index (a broad-based index), whose current level is 8500. Under the terms of the contract, the purchaser (the "long") is entitled to receive, and the seller (the "short") agrees to pay, $1 for every point the index rises above 8500; and the long agrees to pay, and the short is entitled to receive, $1 for every point the index falls below 8500. The upside and downside are both capped at 1000 points, i.e., the long will receive nothing more once the index passes 9500, and the short will receive nothing more once the index goes below 7500. Both the long and the short are required to deposit $1000 (each party's maximum exposure under the contract) with the Market Authority at the time they enter into the contract, and neither party can withdraw any portion of its deposit until the contract expires and each party's total gain or loss is known. Futures contracts designed in this way would preserve an essential feature of the Hedging instrument in that a Market Authority would not need to manage risk because it would always be certain to hold the maximum amount that it would be obligated to pay out to customers on the contracts.

Example 2

Suppose that a Market Authority offers a variable pay-out hedging instrument based on the NASDAQ called something similar to:

8 Apr. 2004 NASDAQ Linear 1950-2050

This name denotes that, within the range 1950 to 2050, a buyer that purchases a contract gains $1 for every point the NASDAQ futures closes above the purchase price and loses $1 for every point the NASDAQ futures closes below the purchase price. If the market breaches either side of the range (i.e. ticks <1950 or >2050) trading is immediately halted for the remainder of the instrument's duration. In our example, the NASDAQ futures close refers to 4 p.m. ET on 8 Apr. 2004.

Purchasing this instrument requires a blockage of funds equal to the buyer's maximum potential loss times the number of shares traded plus any applicable trade and settlement charges, or:

$$((\text{Purchase Price} - \text{Lower Bound}) + \text{Trade/Settlement Charges}) * (\text{\# of contracts})$$

Maximum potential loss is simply (Purchase Price-Lower Bound). If, for instance, trade charges are $0.25 per contract and a trader wishes to purchase 10 contracts at 1985, then blocked funds would be:

$$((1985-1950)+0.50)*(10)=\$355.00$$

Where, the $0.50 refers to a $0.25 trading fees and a $0.25 settlement fee.

Profit or loss would simply be:

$$(\text{Ending Price} - \text{Purchase Price}) * (\text{\# of contracts})$$

And the trader could realize a maximum profit of:

$$(2050-1985)*(10)=\$650,$$

or a maximum loss of:

$$(1950-1985)*(10)=\$350.00.$$

As described above, trading of the variable pay-out contract is halted when trading is outside of the specified range. However, at any point before settlement day a trader may liquidate their position. If, for instance, a trader decides to take profits with the NASDAQ futures trading above the upper limit at 2007, their profit would be:

$$(2007-1985)*(10)=\$220,$$

and the $355 in blocked funds would also be returned to the user, less trade and settlement charges, e.g., $5.

The details of selling are analogous to the buying details described above. Interestingly, short-selling can be handled just as easily as long-selling. Suppose, in the example above, that a trader wished to sell short 10 contracts at 1985:

$$((2050-1985)+0.50))*(10)=\$655.00,$$

would be blocked. The maximum loss would be:

$$(1985-2050)*(10)=\$650$$

which would be covered by the blocked funds. Similarly, the maximum profit is:

$$(1985-1950)*(10)=\$350.00 \text{ profit},$$

and the $655 in Blocked Funds would also be returned to the user, less trade and settlement charges.

As described above, a trader can liquidate their position any time before settlement. If for instance the trader decides to take a loss with the NASDAQ futures trading 2007 (more than the upper limit), the loss would be:

$$(1985-2007)*(10)=\$220 \text{ loss}$$

which would be covered by the $655 Blocked Funds, and the remainder, less trade and settlement charges, would be returned to the user.

The preceding examples show the viability of a linear Hedging instrument model for buying, selling, and selling short. The YES/NO concept has been removed. Variable profits/losses have been achieved while keeping the market fully-funded or capitalized (i.e. no margin) at all times.

The illustrative examples provided above use $1 per point at the incremental value of the variable pay-out instrument. However, this amount may be changed as needed, depending on how wide a range is desired. As a general matter, depending on where the market is in relation to the range (or how wide the range is), the amount of Blocked Funds may be prohibitively high for some traders to take a (large) position. This is simply the nature of sequestering the maximum possible loss to insure a Market Authority remains totally neutral. Preferably, modeling is used to adjust the incremental value so as to maximize the profit of the Market Authority given the P&L/point, trade charges/contract traded, width of range, volatility of underlying, etc.

Given the calculations needed to determine the amount of blocked funds needed for a transaction, it may not be intuitive how many contracts a user can purchase using their Available Cash. Accordingly, some indication is preferrably provided in the form of an informative error message when a user is unable to purchase the number of contracts desired. For example, a message or dialog such as "You are able to buy x contracts with the amount of funds you have available. Click here to learn more" may be provided. The link would lead to an explanation of why funds equal to the user's maximum potential loss need to be available.

As described above, trading of an instrument must halt immediately if the range is broken. This is to keep the profits to be paid out plus trade charges within the total amount a Market Authority has blocked from the various user accounts. An instrument may be designed to 'expire' if a limit is breached, or to remain available for a resumption of trading if the contract price falls back into the permitted range.

Even though hourly or similar "next tick" type contracts may be frowned upon, it may be possible to offer Daily contracts that approximate the adrenaline-rush of shorter duration contracts. For example, if the NASDAQ closed today at 1975, a NASDAQ Linear 1970-1980 could be offered the following morning that expires at the end of the trading day. Given any sort of volatility, the NASDAQ will breach one of the barriers well before the end of the day. Once this contract has been halted, another contract could almost immediately be offered based on the breached limit of the earlier contract, e.g., a NASDAQ Linear 1980-1990 could be offered if the upper limit of 1980 were breached.

Alternatively, the following morning several NASDAQ Linear contracts could be offered at abutting, or overlapping ranges. For example, NASDQ Linear contracts with ranges of 1960-1970, 1970-1980, and 1980-1990, could be offered. Initially, only one of the contracts will be available for trading. However, as the NASDAQ moves it may pass the limit of one contract and enter the trading range of another contract. Launching narrow-range contracts could provide for a fast-paced, lower stakes (tight stop-loss) opportunity for traders. Another possible option is a contract that has an acceleration feature (i.e., the expiration date is accelerated if the contract breaches the range—like a capped option).

Some users will be tying up a significant amount of available cash to get into these contracts. If such contracts are offered, users will likely settlement to occur as soon as possible after liquidation so that Blocked Funds may be unblocked (and would probably ideally like to realize their profits) before the end of day settlement mi. This would enable them to continue trading. Accordingly, in a preferred embodiment of the present invention, settlement is performed continuously. For contracts in which trading is permanently halted due to a limit breach, users' positions are frozen when a breach occurs and any blocked funds of in the money contracts are released for further trading.

In the foregoing, several types of hedging instruments were described, each of which suggests a novel method for hedging certain types of risk as well as suggests a novel system and market for trading in risk instruments to facilitate hedging of risk.

In addition to the foregoing hedging instruments, the present inventors have also conceived of additional hedging instruments each of which suggest still further novel methods for hedging certain types of risk as well as suggests novel systems and markets for trading in risk instruments to facilitate hedging of risk.

Although it would not be considered obvious to one of ordinary skill in the art to conceive of the following hedging constructs, once the type of hedging instrument is defined, as is provided below, one of ordinary skill in the art would appreciate how to make, use and practice the method of risk hedging enabled by these instruments in view of the other disclosure in the present application. Additionally, one of ordinary skill in the art, based on the other disclosures in the present application, would appreciate how to make a system for facilitating the trading in these instruments.

The Corporate Earnings Hedging instruments are designed to allow traders to take a view on a company's reported earnings per share (EPS) for a particular quarter. As specified in the instrument itself, these Hedging instruments will be settled based on a company's GAAP EPS as announced or as reported to the SEC as part of their quarterly filings.

Accounting metrics are designed to allow traders to take a view on figures and metrics listed on financial statements for a particular period of time. These Hedging instruments will be settled based on figures published in the accounting statements as part of their quarterly filings. These include numbers like sales, interest, depreciation, inventory, reserves as well as key business ratios like gross margin, net margins and operating margins.

Trigger Event Hedglets are designed to allow traders to take a view on if a trigger event occurs that may allow parties to exercise or escape from contractual obligations with a company or group of companies. These include instruments that are based around trigger events whether they come about as the result of a specific cash flow figure being reported, a key financial ratio being breached, a debt or loan being restructured or defaulted on, as the result of changes in ownership control or the capital structure.

Corporate Statistics Hedging instruments encompass a wide variety of Hedging instruments based on figures companies officially release to the public as part of their financial statements. Examples include Hedging instruments based on: Wal-Mart's Same-Store-Sales statistics, Intel's Capital Expenditure's Number, General Motors Sales Volumes, Schwab's number of accounts, eBay's number of auctions and any announcements regarding key business statistics etc.

M&A Hedging instruments allow traders to take a position with regard to which companies will publicly announce their intentions to merge. Additional Hedging instruments settling based an announced merger or tender offer being completed or accepted by a particular date.

IPO Hedging instruments enable traders to take a position that a private company will offer shares to the public by a certain date. A related class of Hedging instruments would allow a trader to take a view on a company's market capitalization as of a specified future date.

Bankruptcy Hedging instruments are designed to enable traders to take a position on whether a company will file for relief under Chapter 7 or Chapter 11 of the US Bankruptcy Code by a particular date.

Index Listing/Delisting Hedging instruments enable traders to take a position on whether a particular company is part of a widely followed index (e.g. the DOW, S&P 500, Nasdaq 100, etc) on a given future date. Traders would be empowered to take the position that a company not part of the index will be added by a certain date. Alternatively, traders could take the position that a company currently part of an index will be removed by a given date.

Exchange Delisting Hedging instruments allow traders to take the position that, by a certain future date, a particular company will no longer be listed for trading on a specified exchange.

Credit Ratings Hedging instruments enable traders to take a view regarding the ratings a particular company will maintain from a given Credit Rating Institution (e.g. S&P, Moody's, etc) on a set future date. Related Hedging instruments allow traders to take a view regarding credit rating revisions by a certain date.

Management Team/Board Member Hedging instruments are designed to let traders take a view regarding the composition of a company's Board or Management/Executive team on a given date. Traders will have the opportunity to take positions regarding both additions and removals from the groups as well as CEO votes of no confidence.

Dividend Hedging instruments allow traders to take a view as to how large a corporation's dividend payout will be for a certain time interval.

Shareholder Actions Hedging instruments are designed to allow traders to take a position on any number of proposals that shareholders put to a formal vote.

Capital Change Hedging instruments are designed to allow traders to take a view on the results of announced changes in the capital structures of companies as reported to the SEC as part of their quarterly filings. These include increases and reductions in capital through stock splits/subdivisions, reverse splits/consolidations, write-ups and write-offs, bonus issues, rights issues, and transformation of new lines into or out of the parent security. An example would be the announcement of the listing of a tracking stock.

Income and Principal Payment Events are designed to allow traders to take a view on the results of debt instrument changes such as changes in coupon, and principal payment amounts, changes in fixed and floating coupon rate resets, and early calls for bond redemptions.

What is claimed is:

1. A computer-based contract trading system for formation, sale, resale and settlement of variable pay-out hedging contracts under jurisdiction of a government regulatory agency, the system comprising: a communications interface for sending and receiving data, including trading instructions from traders; a processor system for executing processing modules; a first processing module for receiving data to define a desired contract having a value at a time of maturity determined by a difference between a value of a predefined indicator at the time of maturing and a target value selected at contract formation; a second processing module, responsive to said first processing module, for defining a contract based on said received data; a third processing module for offering for sale and for selling a plurality of said contracts to traders; a fourth processing module for accepting orders to trade one or more of said contracts; a fifth processing module for determining whether an originator of an order to trade one or more of said contracts is able to perform the order; a sixth processing module for matching an order to sell said contracts with orders to purchase said contracts; a seventh processing module for settling contracts at maturity thereof; and wherein said system retains transaction information for compliance with regulations of the government agency.

2. The computer-based contract trading system in accordance with claim 1, wherein the fifth processing module makes the determination when an order is submitted to the computer-based contract trading system.

3. The computer-based contract trading system in accordance with claim 2, wherein assets of an originator of an order are frozen at the time the determination is made so as to ensure the assets are available to satisfy the order should it be matched with a corresponding order by the sixth processing module.

4. The computer-based contract trading system in accordance with claim 3, wherein the difference between the value of a predefined indicator and the target value are capped and the assets frozen such that their value is equal to a maximum exposure determined by said capped difference.

5. The computer-based contract trading system in accordance with claim 1, wherein the fifth processing module makes the determination when the sixth processing module has identified a possible match between an order to sell a contract and an order to buy a contract.

6. The computer-based contract trading system in accordance with claim 5, wherein the sixth processing module submits matched orders to buy and sell said contracts to the seventh processing module responsive to the determination of the fifth processing module.

7. The computer-based contract trading system in accordance with claim 6, wherein the sixth processing module cancels orders if the fifth processing module determines that an originator of the order does not have sufficient assets to complete the order.

8. The computer-based contract trading system in accordance with claim 5, wherein the originator of an order canceled because of insufficient assets is charged a penalty.

\* \* \* \* \*